(12) United States Patent
Chono

(10) Patent No.: US 9,071,846 B2
(45) Date of Patent: Jun. 30, 2015

(54) MOVING PICTURE ENCODING METHOD AND APPARATUS FOR PERFORMING A MULTI-FRAME MOTION PREDICTION WITH REFERENCE TO A PLURALITY OF PICTURE FRAMES

(75) Inventor: Keiichi Chono, Minato-ku (JP)

(73) Assignee: NEC CORPORATION, Tokyo (JP)

( * ) Notice: Subject to any disclaimer, the term of this patent is extended or adjusted under 35 U.S.C. 154(b) by 1379 days.

(21) Appl. No.: 10/584,220

(22) PCT Filed: Dec. 24, 2004

(86) PCT No.: PCT/JP2004/019355
§ 371 (c)(1),
(2), (4) Date: Jun. 23, 2006

(87) PCT Pub. No.: WO2005/064947
PCT Pub. Date: Jul. 14, 2005

(65) Prior Publication Data
US 2007/0147500 A1 Jun. 28, 2007

(30) Foreign Application Priority Data
Dec. 25, 2003 (JP) .................................. 2003-430577

(51) Int. Cl.
*H04N 19/577* (2014.01)
*H04N 19/172* (2014.01)
(Continued)

(52) U.S. Cl.
CPC ........... *H04N 19/577* (2014.11); *H04N 19/172* (2014.11); *H04N 19/115* (2014.11); *H04N 19/124* (2014.11); *H04N 19/157* (2014.11); *H04N 19/31* (2014.11); *H04N 19/573* (2014.11)

(58) Field of Classification Search
CPC ............................... H04N 7/50; H04N 19/577
USPC .................................................... 375/240.14

IPC .......................................................... H04N 7/12
See application file for complete search history.

(56) References Cited

U.S. PATENT DOCUMENTS

| 6,072,831 A | 6/2000 | Chen |
| 6,560,284 B1 | 5/2003 | Girod et al. |

(Continued)

FOREIGN PATENT DOCUMENTS

| JP | 8-32972 A | 2/1996 |
| JP | 9-191458 A | 7/1997 |

(Continued)

OTHER PUBLICATIONS

Wiegand T: "H.26L Test Modek Long-Term No. 9 (TML-9) Drafto" ITU-T Telecommunication Standarization Sector of ITU, Geneva, CH Dec. 21, 2001 pp. 1, 3-75, XP001086625.

(Continued)

*Primary Examiner* — Sath V Perungavoor
*Assistant Examiner* — James Pontius
(74) *Attorney, Agent, or Firm* — Sughrue Mion, PLLC

(57) ABSTRACT

A moving picture encoding method for performing a multi-frame motion prediction with reference to a plurality of picture frames that includes, in reference frames used for the multi-frame motion prediction, a frame that has been encoded in a higher picture quality than the other frames of the same picture type. The frame encoded in the higher picture quality is a P-picture frame or a B-picture frame, for example, and preferably is a frame to which more code amount is assigned than the other frames of the same picture type or a frame having a smaller quantizing parameter than the other frames of the same picture type.

14 Claims, 20 Drawing Sheets

(51) Int. Cl.
*H04N 19/115* (2014.01)
*H04N 19/124* (2014.01)
*H04N 19/157* (2014.01)
*H04N 19/31* (2014.01)
*H04N 19/573* (2014.01)

(56) References Cited

U.S. PATENT DOCUMENTS

2006/0098738 A1* 5/2006 Cosman et al. .......... 375/240.16
2006/0291559 A1* 12/2006 Fries et al. ............... 375/240.15

FOREIGN PATENT DOCUMENTS

| JP | 10-304374 | A | | 11/1998 | | |
|---|---|---|---|---|---|---|
| JP | 11-177983 | A | | 7/1999 | | |
| JP | 2001-128179 | A | | 5/2001 | | |
| JP | 2001-128179 | | * | 11/2001 | ............... | H04N 7/32 |
| JP | 2002-125232 | A | | 4/2002 | | |
| JP | 2003-87732 | A | | 3/2003 | | |
| JP | 2003-111081 | A | | 4/2003 | | |
| JP | 2003-284077 | A | | 10/2003 | | |
| JP | 2003-299103 | A | | 10/2003 | | |
| JP | 2003-304538 | A | | 10/2003 | | |
| WO | 99/63760 | A1 | | 12/1999 | | |
| WO | WO 99/63760 | | * | 12/1999 | ............... | H04N 7/50 |
| WO | 2004/064373 | A2 | | 7/2004 | | |

OTHER PUBLICATIONS

Girod, et al., Multi-frame motion-compensated video compression for the digital set-top box, Proc. of IEEE Int'l Conf. on Image Processing, vol. 2, pp. II-1-II-4.

Office Action dated Apr. 5, 2013 issued by the European Patent Office in corresponding European Patent Application No. 04 807 712.7.

Chellappa, et al., "Dual frame motion compensation for a rate switching network", Conference Record of the 37th. Asilomar Conference on Signals, Systems, & Computers. vol. 2, Nov. 9, 2003, pp. 1539-1543, XP010701133.

Markus Beermann, "Spatio-Temporal Rate Allocation for Hybrid Video Coding", Visual Communications and Image Processing, Jul. 8, 2003, pp. 222-230, XP030080643.

Vijay Chellappa, Cosman, P.C., Voelker, G.M., "Dual frame motion compensation with uneven quality assignment", Proceedings of the Data Compression Conference (DCC '04), Mar. 23, 2004, pp. 262 to 271.

* cited by examiner

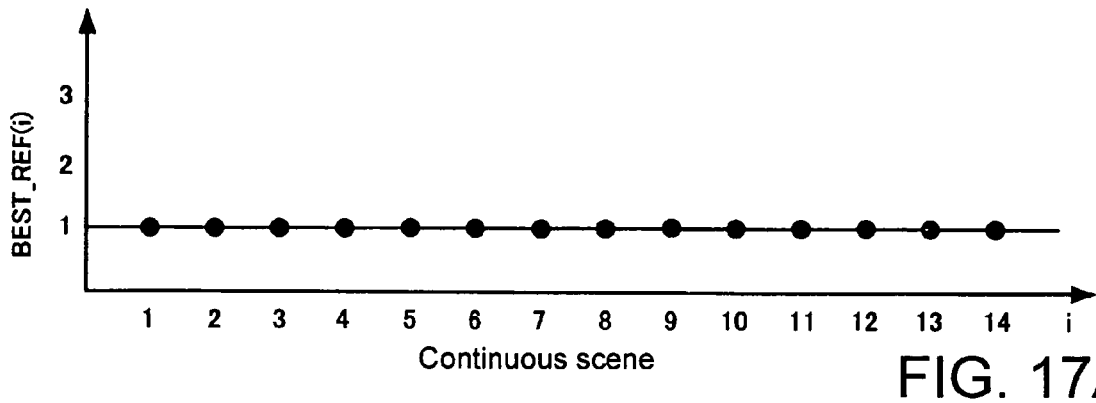
FIG. 17A Continuous scene
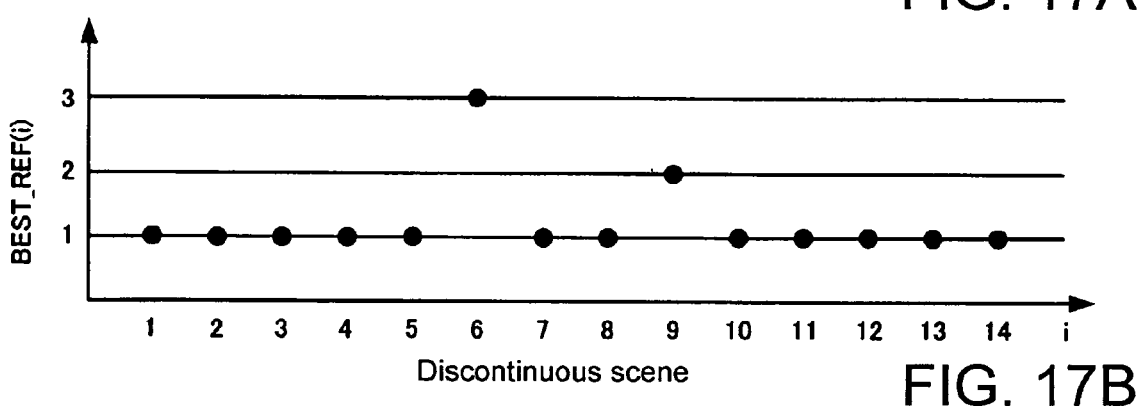
FIG. 17B Discontinuous scene
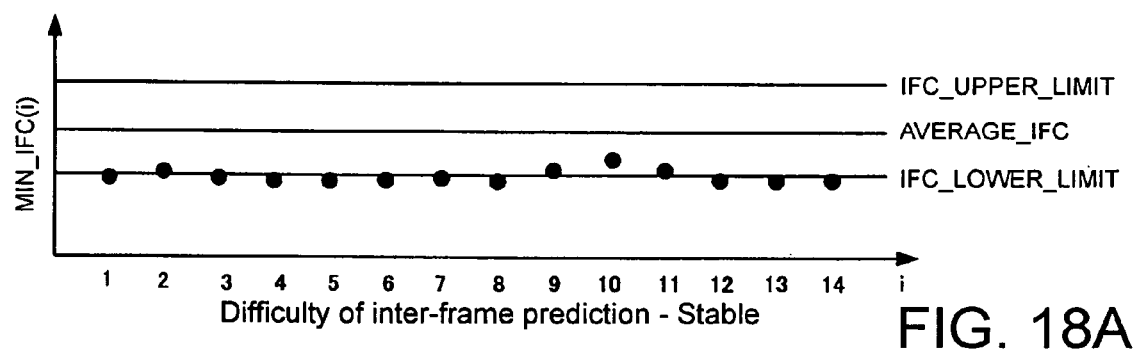
FIG. 18A Difficulty of inter-frame prediction - Stable
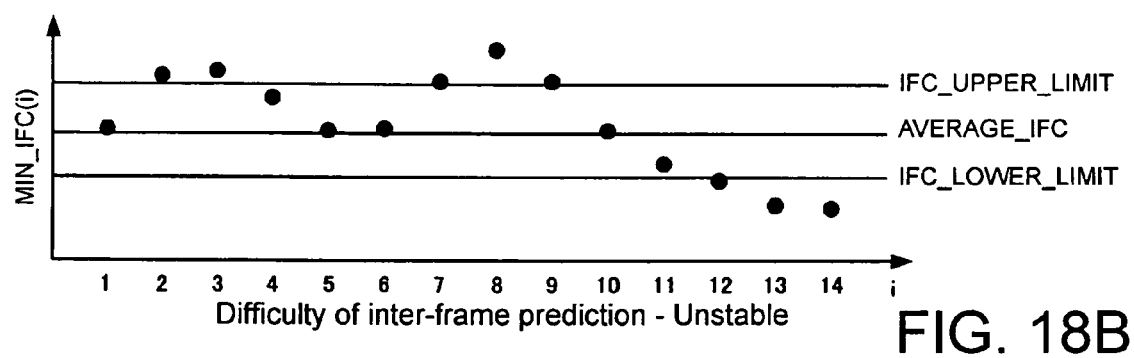
FIG. 18B Difficulty of inter-frame prediction - Unstable

MOVING PICTURE ENCODING METHOD AND APPARATUS FOR PERFORMING A MULTI-FRAME MOTION PREDICTION WITH REFERENCE TO A PLURALITY OF PICTURE FRAMES

This application claims priority from PCT Application No. PCT/JP2004/019355 filed Dec. 24, 2004, and from Japanese Patent Application No. 2003-430577 filed Dec. 25, 2003, which applications are incorporated herein by reference.

TECHNICAL FIELD

The present invention relates to a moving picture encoding technique, and in particular relates to a moving picture encoding method and apparatus for performing a multi-frame motion prediction.

BACKGROUND ART

FIG. 1 is a block diagram showing a configuration of a conventional typical encoding apparatus for encoding a moving picture signal.

The encoding apparatus shown in FIG. 1 includes a local decoding apparatus, and is provided with frequency conversion unit 101, quantization unit 102, variable length encoding unit 103, dehumanization unit 104, inverse frequency conversion unit 105, frame memory 106, intra-frame prediction unit 107, motion compensation unit 108, motion estimation unit 109, buffer 110, and code amount control unit 111. The encoding apparatus further includes subtractor 121, switch 122, and adder 123.

An input picture frame is fed into the encoding apparatus and is divided into a plurality of blocks. A predicted value by an intra-frame prediction or an inter-frame prediction is subtracted from the divided block by subtractor 121. Here, the intra-frame prediction is a technique for predicting a current picture by using a reconstructed area of the current frame to be encoded, and the inter-frame prediction is a technique for predicting a current picture by using a picture frame that is previously reconstructed. The picture block in which the predicted value by the intra-frame prediction or the inter-frame prediction is subtracted is called a prediction error. Incidentally, a picture frame in which all blocks in a frame to be encoded are encoded by only the intra-frame prediction for producing predicted values from adjacent pixels in the same frame to be encoded, is called an I-picture. A picture frame coded by using both the intra-frame prediction and the inter-frame prediction is called a P-picture. Further, in the inter-frame prediction, a picture frame coded by referring to a plurality of picture frames, which are input before and after the current encoded frame, is called a B-picture.

Generally, in the moving picture data to be encoded, I-pictures are set at constant intervals, and a section that is separated by the I-picture and includes a plurality of frames is called a GOP (Group Of Picture). Definitions of the I-, P-, and B-pictures and the GOP are stipulated by the MPEG (Motion Picture Expert Group), which is the moving picture encoding standard in the international standardization.

Then, the prediction error is converted into a frequency domain by frequency conversion unit 101. The prediction error converted into the frequency domain is quantized by quantization unit 102. The quantized prediction error, i.e., a conversion coefficient is entropy-encoded by variable length encoding unit 103 and is stored in buffer 110. Buffer 110 outputs the stored occurring code, i.e., a bitstream with predetermined timing. Also, the quantized prediction error is returned to the prediction error of the original spatial domain again as a local decoding process by dequantization unit 104 and inverse frequency conversion unit 105. Further, the predicted value is added to the prediction error returned to the spatial domain by adder 123, and the prediction error is stored in frame memory 106 as a reconstructed picture.

The reconstructed picture that has been stored in frame memory 106 is referred by intra-frame prediction unit 107, motion compensation unit 108 and motion estimation unit 109 to produce the predicted value. Therefore, the reconstructed picture stored in frame memory is also called a reference frame.

Intra-frame prediction unit 107 performs the intra-prediction in accordance with the restructured picture in frame memory 107, and outputs the predicted value. Motion estimation unit 109 detects the motion vector of the input block and the reference frame in accordance with the input picture block and the reference frame read from frame memory 106 to minimize a difference between the input block and the predicted value, i.e., the prediction error. Motion compensation unit 108 produces the predicted value from the reference frame stored in frame memory 106 by using the motion vector and the reference frame supplied from motion estimation unit 109. The predicted value by motion compensation unit 109 is based on the inter-frame prediction. Therefore, switch 122 is arranged to switch the predicted value output from intra-frame prediction unit 107 and the predicted value output from motion compensation unit 108 to be supplied to subtractor 121.

The bitstream, which is the moving picture information compressed in the above process, is made of a variable length code, mainly including a conversion coefficient of each block, a quantizing parameter, a motion vector (to minimize the prediction error), and a reference frame (to minimize the prediction error).

The above is the principle operation in the moving picture compression technique.

Now, generally, in a digital broadcast system or a picture communication service, the moving picture signal is controlled about the occurring code amount, i.e., the bit rate thereof for transmission/storage. Then, code amount control unit 111 detects the occurring code amount supplied from variable length encoding unit 103 and performs the two processes, as described later, to control the occurring code amount.

In the first process, code amount control unit 111 sets a target code amount for each frame in accordance with each picture type. When R is a code amount assigned to a frame that has not been encoded in GOP, Np and Nb are numbers of P-pictures and B-pictures, which have not been encoded in GOP, respectively, Xi, Xp, Xb are parameters, each of which represents frame complexity of each picture, defined by equations (1) to (3), and Kp and Kb are parameters in consideration of subjective picture qualities by picture type, target code amounts Ti, Tp, Tb by picture types are then given by equations (4) to (6).

$$Xi = Qi \times Ci \tag{1},$$

$$Xp = Qp \times Cp \tag{2},$$

$$Xb = Qb \times Cb \tag{3},$$

$$Ti = R/(1 + Np \times Xp/(Kp \times Xi) + Nb \times Xb/(Kb \times Xi)) \tag{4},$$

$$Tp = R/(Np + Nb \times Kp \times Xb/(Kb \times Xp)) \tag{5, and}$$

$$Tb = R/(Nb + Np \times Kb \times Xp/(Kp \times Xb)) \tag{6}.$$

Where Ci, Cp, Cb are respectively occurring code amounts of I-, P-, B-pictures that are finally coded, and Qi, Qp, Qb are respectively average quantization step sizes of I-, P-, B-pictures that are finally coded. Incidentally, in the following explanations, for convenience in writing, one value among Ci, Cp, Cb is expressed as Ci,p,b. Also, the expression of Qi,p,b=Xi,p,b/Ti,p,b collectively represents the equation of Qi=Xi/Ti in relation to the I-picture, the equation of Qp=Xp/Tp in relation to the P-picture, and the equation of Qb=Xb/Tb in relation to the B-picture.

Whenever each frame is encoded in accordance with the first process and the second process, which will be described later, code amount R assigned to a frame that has not been encoded in GOP is updated in accordance with equation (7).

$$R=R-Ci,p,b \quad (7).$$

Further, when a head picture of GOP is encoded, code amount R is initialized by equation (8).

$$R=\text{bit\_rate} \times N/\text{frame\_rate}+R \quad (8).$$

Where, bit_rate is a target bit rate, frame_rate is a frame rate, and N is the number of frames in GOP.

In the second process, in order to coincide code amounts Ti, Tp, Tb assigned to respective frames, obtained in the first process, with actual occurring code amounts, quantization steps are obtained by feedback control in macroblock units in accordance with the virtual buffer capacity that is set by each picture type.

First, prior to encoding of the j-th macroblock, occupation amounts in the virtual buffer are obtained by picture types in accordance with equation (9).

$$di,p,b(j)=di,p,b(0)+B(j-1)-Ti,p,b \times (j-1)/MB\text{count} \quad (9).$$

di,p,b(0) is an initial occupation amount in the vertical buffer, B(j) is an occurring code amount from a head to the j-th macroblock in the frame, and MBcount is the number of macroblocks in the frame.

When encoding of each frame is finished, initial occupation amounts di,p,b(MBcount) in the vertical buffer by picture types are used as initial occupation amounts di,p,b(0) in the vertical buffer relative to the next picture.

Then, quantization step size Q(j) relative to the j-th macroblock is calculated in accordance with equation (10).

$$Q(j)=Qi,p,b \times di,p,b(j) \times 31/(10 \times r) \quad (10), \text{ and}$$

$$Qi,p,b=Xi,p,b/Ti,p,b \quad (11).$$

Where r is a parameter used to control the response speed of the feedback loop, which is called a reaction parameter, and is represented by equation (12).

$$r=2 \times \text{bit\_rate}/\text{frame\_rate} \quad (12).$$

Incidentally, initial occupation amounts di,p,b(0) in the virtual buffer at the start of encoding are represented by equations (13) to (15).

$$di(0)=10 \times r/31 \quad (13),$$

$$dp(0)=Kp \times di(0) \quad (14), \text{ and}$$

$$db(0)=Kb \times di(0) \quad (15).$$

On the other hand, a moving picture encoding scheme is proposed in which a multi-frame motion prediction that enables the motion prediction is incorporated, that is, the P-picture is predicted from not only the I-picture or the P-picture that is just previously encoded but also the frame that is already encoded and the B-picture is predicted from not only the I-picture or the P-picture that is just previously encoded but also the B-picture that is already encoded. In this scheme, since a high-quality frame that is previously encoded is selected, and then the motion prediction can be performed degree of freedom in the motion prediction increases.

DISCLOSURE OF INVENTION

Problems to be Solved by the Invention

However, the conventional moving picture encoding technique, as described above, controls the code amount assigned to each frame only by using the picture type and the complexity of each picture that is finally encoded, without using the degree of freedom in the motion prediction according to the multi-frame motion prediction. Therefore, according to the conventional technique, in the moving picture compression using the multi-frame motion prediction, moving pictures are not encoded in a high picture quality by using the multi-frame motion prediction effectively. Conversely, in the moving picture compression using the multi-frame motion prediction, a technique is desired in which moving pictures can be encoded in a high picture quality by using the multi-frame motion prediction effectively.

An object of the present invention is to provide a moving picture encoding method of encoding a moving picture in a high picture quality by effectively using the multi-frame prediction.

Another object of the present invention is to provide a moving picture encoding apparatus for encoding a moving picture in a high picture quality by effectively using the multi-frame prediction.

Means for Solving the Problems

The object of the present invention is attained by a moving picture encoding method for performing a multi-frame motion prediction with reference to a plurality of picture frames, wherein the method comprises including, in reference frames used for the multi-frame motion prediction, a frame that has been encoded in a higher picture quality than the other frames of the same picture type.

Another object of the present invention is attained by a moving picture encoding apparatus for performing a multi-frame motion prediction with reference to a plurality of picture frames, the apparatus being characterized in that it includes selection means for selecting at least one reference frame from a plurality of reference frames of the same picture type, and encoding means for encoding the selected reference frame in a higher picture quality than the other reference frames of the same picture type.

According to the present invention, in the moving picture compression using the multi-frame motion prediction, not the picture type and the complexity of each picture that is finally encoded are simply used, but code amount control is performed so as to improve the effects of the motion prediction of the whole scene by encoding a frame having high priority as a reference frame in a high picture quality in consideration of the relationship between the subject frame to be encoded and the reference frame in the multi-frame motion prediction. With this arrangement, according to the present invention, in the moving picture compression using the degree of freedom of the motion prediction by the multi-frame motion prediction, the moving picture encoding method in the higher picture quality can be carried out.

Also, in accordance with the scene of the moving picture, frames to be encoded in a higher picture quality are arranged at constant frame intervals or the frame interval of frames to be encoded in a higher picture quality are adaptively changed in accordance with differential information and motion information between the reference frame and the subject frame to be encoded, thereby precisely selecting the reference frame to be encoded in a higher picture quality with priority, and thus the code amount control for moving pictures in the higher picture quality can be provided. Accordingly, the moving pictures can be encoded in a still higher picture quality.

Also, the more code amount is assigned to the B-picture frame with high priority as a reference frame, thereby providing code amount control for moving pictures in a higher picture quality. Accordingly, since the effects of the motion prediction of the whole sequence can be improved, moving pictures can be encoded in a higher picture quality.

BRIEF DESCRIPTION OF THE DRAWINGS

FIG. 17A is a view for explaining an optimal reference frame.

FIG. 17B is a view for explaining the optimal reference frame.

FIG. 18A is a view for explaining the difficulty of the inter-frame prediction.

FIG. 18B is a view for explaining the difficulty of the inter-frame prediction.

BEST MODE FOR CARRYING OUT THE INVENTION

In the present invention, as described above, an encode amount is controlled in a manner that effects of motion prediction of whole scene are improved, in consideration of the relationship between a subject frame to be encoded and a reference frame in the multi-frame motion prediction, by encoding a frame with a high priority as the reference frame in a high picture quality.

In the following description, "scene" means any number of continuous frames. "A frame is encoded in a high picture quality" means that more code amount is assigned to the frame, or that the quantization step size of the frame is made small, or that coding distortion in the frame is reduced.

Hereinafter, the basic principle of the present invention is explained as compared with the conventional art.

According to the present invention, in the moving picture encoding method using the multi-frame motion prediction, picture qualities of frames of the same picture type are not even but variable, thereby enhancing the effects of the motion prediction of the whole scene to encode a moving picture in a high picture quality. On the other hand, in the conventional moving picture encoding method using the motion prediction method, because the motion prediction is performed only by the picture that has been just encoded, only the encoding can be performed in which the picture qualities of frames of the same picture type are kept even. As its reason, when the picture qualities in the same scene are varied, a difference between frames increases in a frame that refers to another frame in the lowered picture quality and the effects of the motion prediction are lowered. Therefore, the encoding efficiency of the whole scene is lowered, and thus the picture quality of the moving picture that is encoded is lowered.

Next, this problem is explained with reference to FIG. 2.

Figure 2:
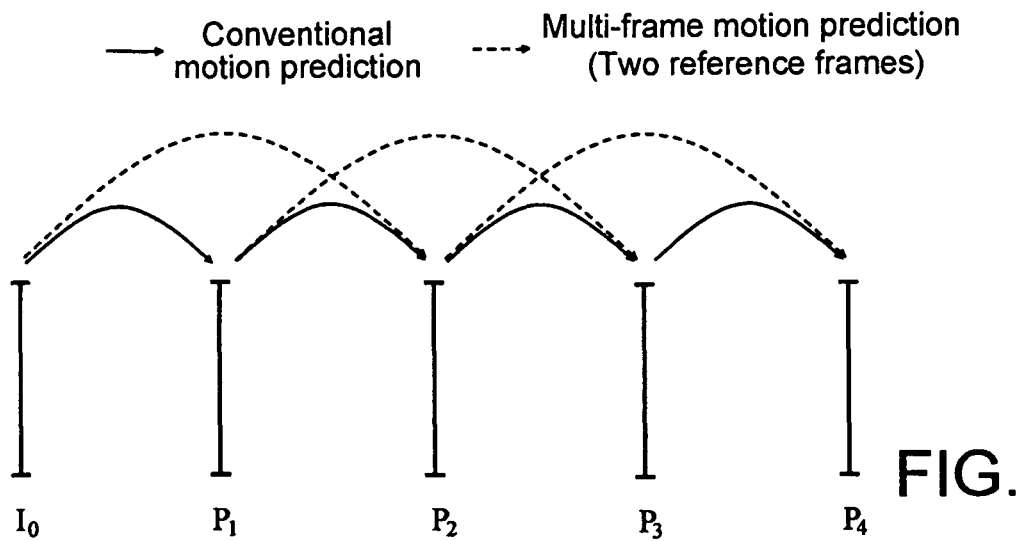
FIG. 2 is a view for explaining a moving picture encoding process according to the present invention.

As indicated by solid lines in FIG. 2, in the conventional motion prediction, each P-picture refers to only the I- or P-picture that has been just encoded. Even if $P_2$, $P_4$ frames are tried to be encoded in a higher quality than $P_1$, $P_3$ frames, $P_1$ frame is encoded in the low picture quality, and therefore the effects of the motion prediction in $P_2$ frame that refers to $P_1$ frame are significantly lowered and the picture quality in $P_2$ frame is also significantly lowered. The picture quality in $P_3$ frame that refers to $P_2$ frame is also significantly lowered, and because the picture quality lowering propagates in the following frames, the picture quality of the whole scene is lowered. Therefore, in the method using the conventional motion prediction, the picture quality of pictures of the same picture type must be kept even.

However, like the coding method to which the present invention is applied, there is a multi-frame motion prediction that can perform a motion prediction, by referring to not only the frame that has been just encoded, but also the frames that have been already encoded. In the case of FIG. 2 according to the multi-frame motion prediction, predictions indicated by dot lines can be performed in addition to the conventional method. In this case, a frame to be referred can be selected by an area or by a block in the frame.

With this multi-frame prediction arrangement, it is possible to perform the encoding that varies the picture quality in spite of the same picture type. The present invention is explained with reference to FIG. 2.

In the multi-frame motion prediction shown in FIG. 2, each P-picture refers to a plurality of I- or P-pictures that have been just encoded. In this example, two I- or P-pictures are referred. Even if $P_1$ frame is encoded in the low quality when $P_2$, $P_4$ frames are tried to be encoded in a higher quality than $P_1$, $P_3$ frames, in $P_2$ frame that refers to not only $P_1$ frame but also $I_1$ frame, the effects of the motion prediction are not significantly lowered. Therefore, $P_2$ frame is encoded in a higher quality.

Also, the effects of the motion prediction in $P_3$ frame that refers to $P_2$ frame encoded in the high picture quality are enhanced, and $P_3$ frame is encoded in a higher quality than the conventional art. Further, since $P_4$ frame refers to $P_2$, $P_3$ frames that are encoded in the high picture quality, $P_4$ frame is encoded in a higher quality. In the following frames, the effects of the motion prediction are enhanced and moving pictures can be encoded in a high picture quality, similarly to the above frames.

With this arrangement, the effects of the motion prediction are enhanced rather than the conventional art, and moving pictures can be encoded in a high picture quality. Also, the moving pictures that are encoded according to the present invention subjectively provide the higher picture quality than the conventional art, because the frames that are encoded in the high picture quality are periodically displayed when being decoded, and by persistence of vision, i.e., by the human visual feature.

Figure 3:
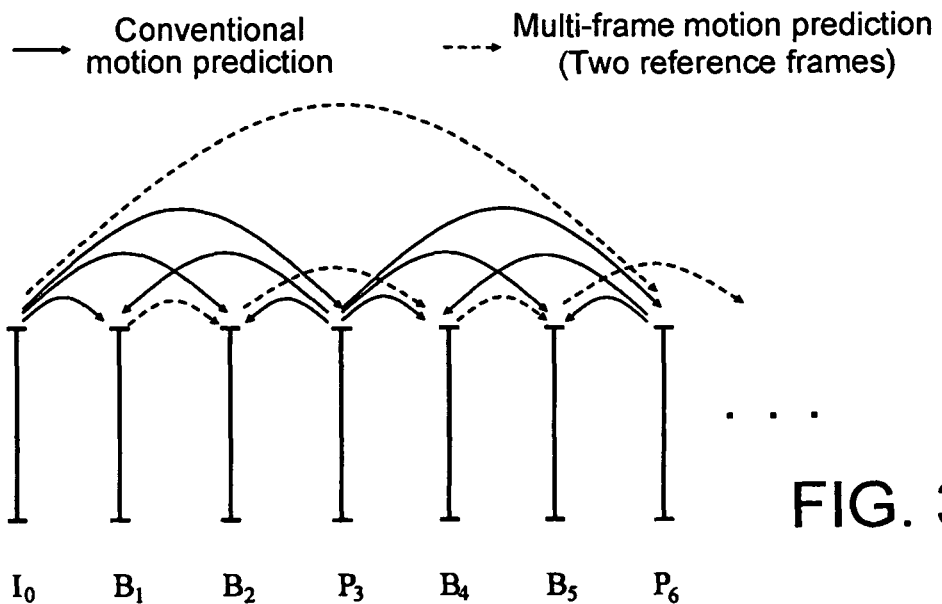
FIG. 3 is a view for explaining the moving picture encoding process according to the present invention.

In the above description, the example using only I- and P-picture is shown, however, the present invention is available to a case of using I-, P-, and B-pictures are used. With reference to FIG. 3, explanations are given of the advantages according to the present invention in the case where I-, P-, and B-pictures exist, in comparison with the conventional art. Incidentally, the basic concept relative to P-picture is similar to that shown in FIG. 2, and therefore explanations are given below while paying attention to only B-picture.

In the conventional art, the B-picture frame is a frame not to be referred, i.e., a frame that is not referred from another frame. Therefore, when B-picture frames are continuous, the effects of the motion prediction in respective B-pictures, which are continuous, are equal. Therefore, the same code amount is assigned to the respective B-frames, which are continuous, and the B-frames are encoded in the same picture quality. As the reason in that the effects of the motion prediction of respective B-pictures, which are continuous, are made equal, when attention is given to $B_1$ and $B_2$ frames in the example of FIG. 3, distances from $I_0$, $P_3$ frames to $B_1$ frame are respectively one and two, and distances from $I_0$, $P_3$ frames to $B_2$ frame are respectively two and one, and both totals of frame distances for determining the effects of the motion prediction are three.

However, in the moving picture encoding that uses the multi-frame motion prediction, a B-picture can also refer to another B-picture that is previously encoded. Therefore, the effects of the motion prediction of continuous B-pictures are variable. When an attention is given to $B_1$ and $B_2$ frames in FIG. 3, $B_2$ frame can perform the motion prediction that refers to not only $I_0$ frame but also $B_1$ frame having a short interframe distance, and $B_2$ frame can provide higher performance of the motion prediction than $B_1$ frame, as is apparent. Therefore, even if the same code amount is not assigned to $B_1$ and $B_2$ frames, $B_1$ and $B_2$ frames can be encoded in the same picture quality.

With this technique, according to the present invention, in the moving picture encoding method using the multi-frame motion prediction, a code amount is distributed to a leading reference B-frame by priority in order of encoding in continuous B-frames, thereby performing the moving picture encoding in a high picture quality. Since the code amount is assigned to $B_1$ and $B_2$ frames in FIG. 3 by priority, $B_1$ frame is encoded in the higher picture quality than the conventional art and $B_2$ frame, which refers to $B_1$ frame, is encoded in the higher picture quality, can be encoded in a higher picture quality. In other words, by varying picture qualities of B-picture frames, the effects of the whole motion prediction are enhanced and moving pictures can be encoded in a higher picture quality.

Explanations are given below of concrete embodiments of the present invention.

Figure 1:
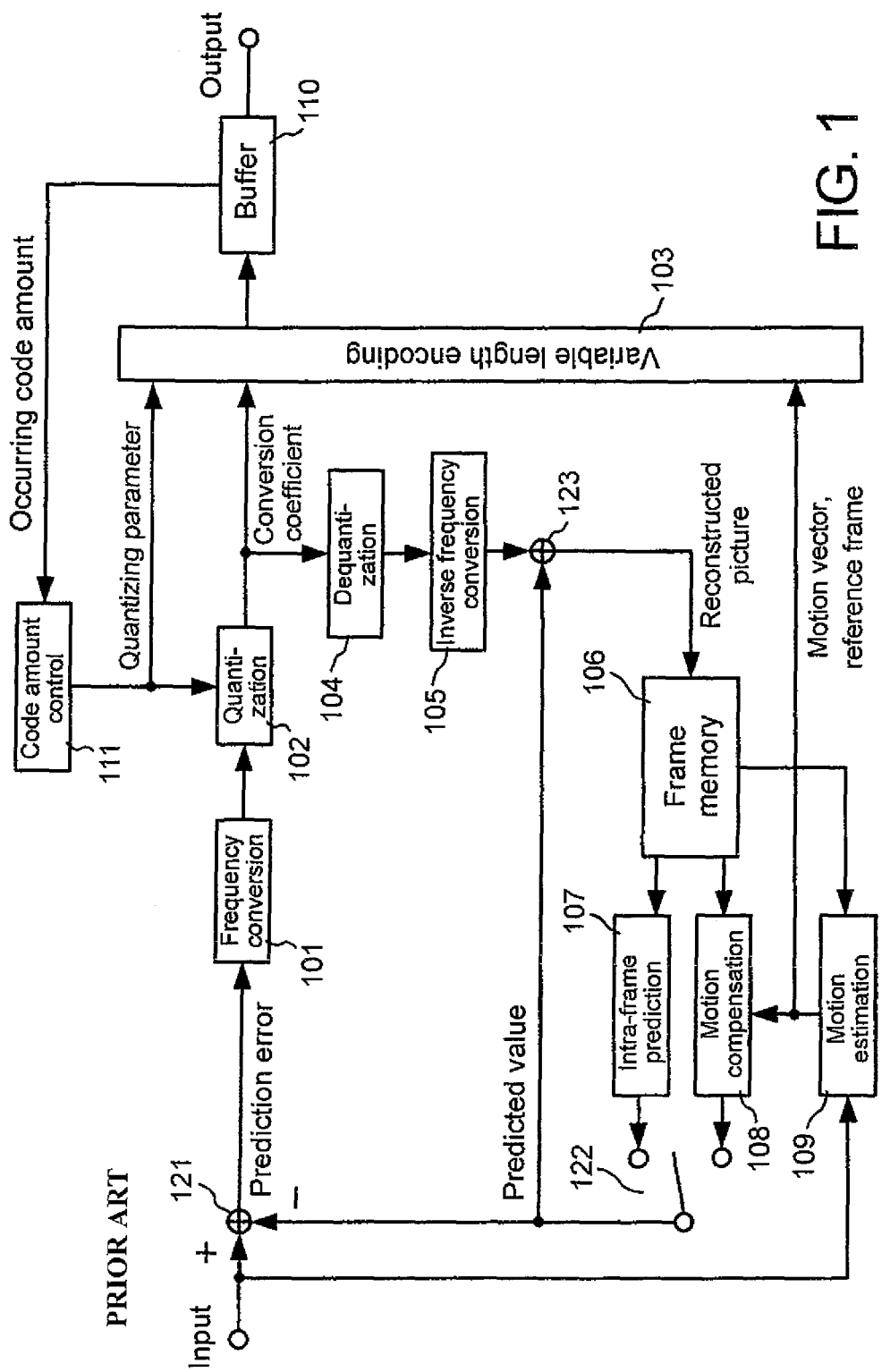
FIG. 1 is a block diagram showing a configuration of a conventional typical moving picture encoding apparatus.
Figure 4:
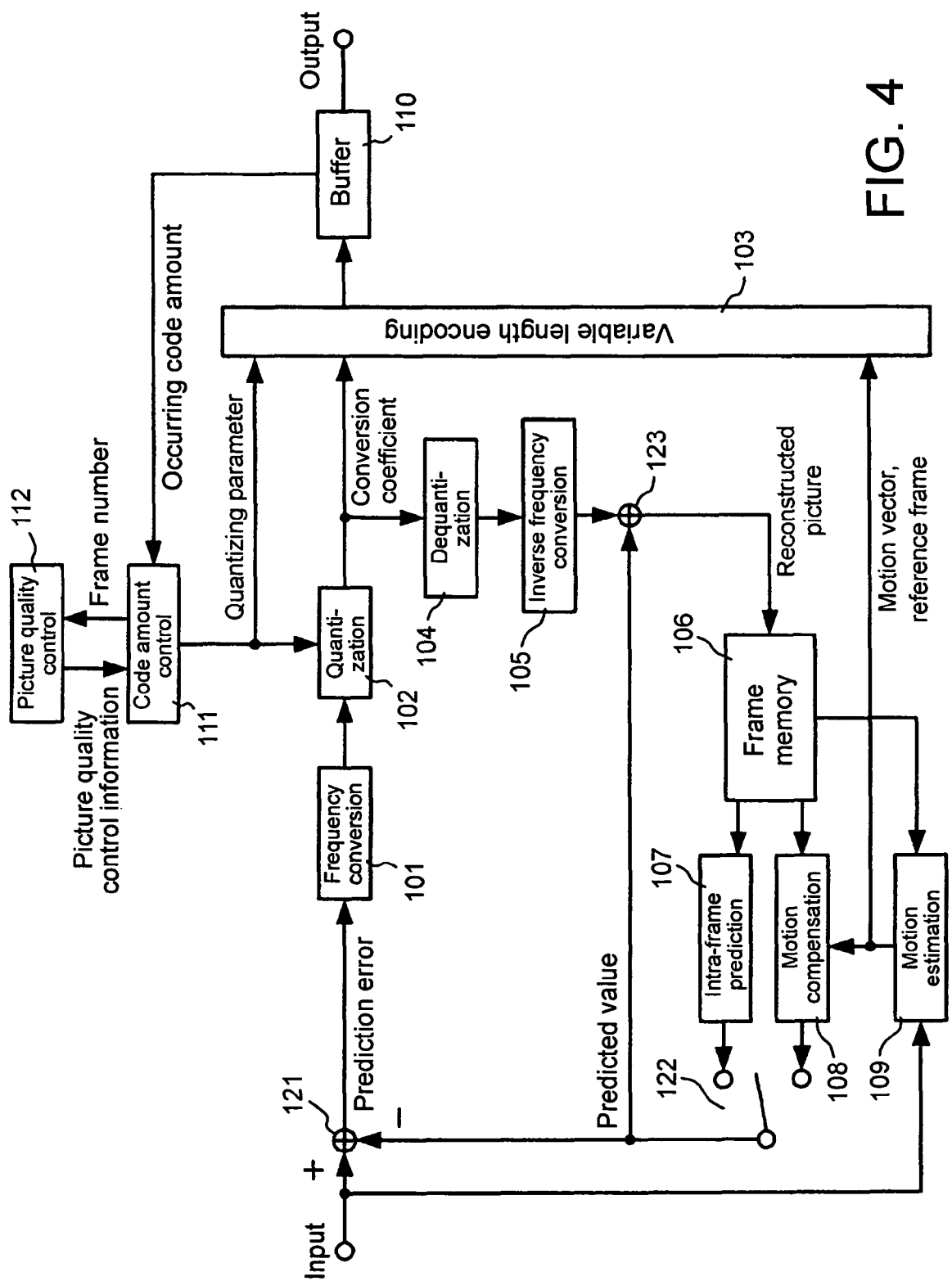
FIG. 4 is a block diagram showing a configuration of a moving picture encoding apparatus according to a first embodiment of the present invention.

A moving picture encoding apparatus according to the first embodiment of the present invention, shown in FIG. 4, further includes picture quality control unit 112 in addition to the moving picture encoding apparatus shown in FIG. 1, and code amount control unit 111 determines an assignment code amount that corresponds to a reference frame, based on picture quality control information supplied from picture quality control unit 112. In FIG. 4, the same reference numerals are applied to the same constitutional elements in FIG. 1, and detailed explanations thereof are omitted. Incidentally, in the first embodiment, the operation is explained when I-picture and P-picture are used as picture types used to encode frames. Hereinafter, explanations are given of picture quality control unit 112 and code amount control unit 111, which are distinctive of the moving picture encoding apparatus according to the first embodiment.

Figure 5:
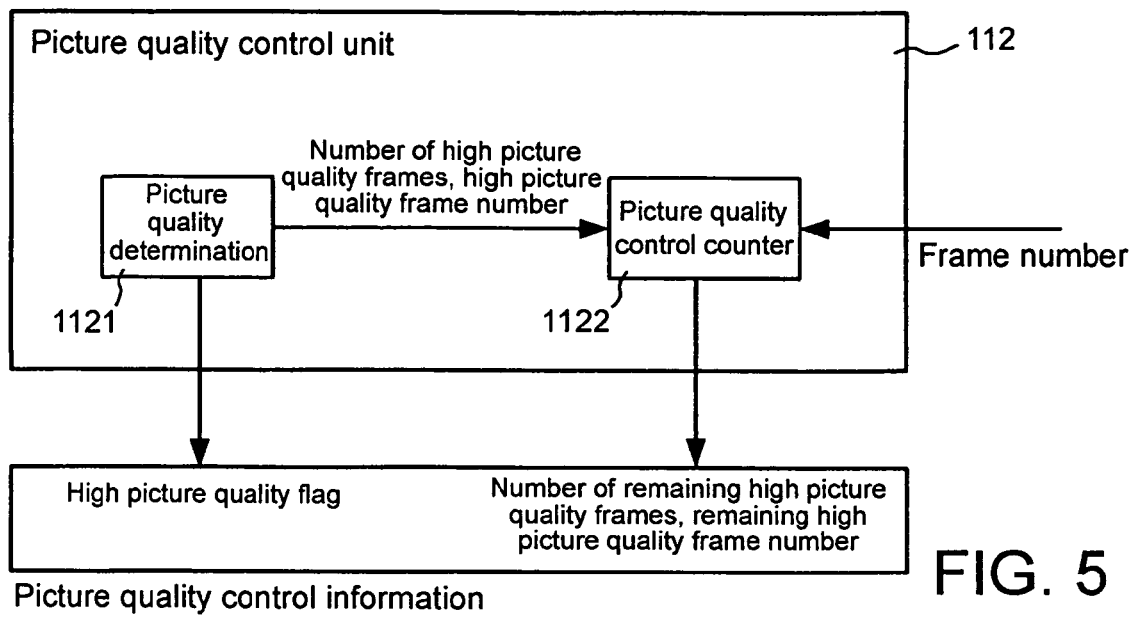
FIG. 5 is a block diagram showing a configuration of a picture quality control unit.

As shown in FIG. 5, picture quality control unit 112 includes picture quality determination unit 1121 and picture quality control counter 1122. The picture quality control information supplied from picture quality control unit 112 includes high picture quality flag HQ_flg, number of remaining high picture quality frames R_HQ_num, and remaining high picture quality frame number R_HQ_frame_num. Picture quality determination unit 1121 in picture quality control unit 112 calculates high picture quality flag HQ_flg, number of high picture quality frames R_HQ_num, and high picture quality frame number R_HQ_frame_num, and supplies high picture quality flag HQ_flg to code amount control unit 111 and supplies number of high picture quality frames HQ_num and high picture quality frame number HQ_frame_num to picture quality control counter 1122.

Hereinafter, the operation of picture quality determination unit 1121 according to the first embodiment is explained with reference to FIG. 6. In the following explanation, a frame interval between mutual frames to be encoded in a high picture quality is represented by S, a frame number that has been just determined to be encoded in a high picture quality is represented by prev_$_{h}$q_num, and the number of frames that have been determined to be in a high picture quality is represented by i. Additionally, S≤MAX_REF is satisfied, where an interval between a subject frame to be encoded and the previous-most frame that can be referred by the multi-frame prediction is represented by MAX_REF. Both the initial values of prev_hq_num and i are 0.

Incidentally, in the first embodiment, frame interval S that is encoded in a high picture quality may be changed in accordance with a motion speed or a frame rate after compression by a period, for example, by GOP or by a scene. By selecting frame interval S by GOP or by scene so as to be suitable thereto, the encoding efficacy according to the present invention is further improved.

In step S101, picture quality determination unit 1121 calculates number of high picture quality frames HQ_num by using equation (16) based on frame interval S and number N of frames in GOP.

$$HQ\_num=(N/S)-1 \quad (16).$$

Then, in step S102, picture quality determination unit 1121 determines whether or not number i of frames that have been determined to be in a high picture quality is smaller than number of high picture quality frames HQ_num. When smaller, step S103 is executed, and when not smaller, the process is finished.

In step S103, picture quality determination unit 1121 calculates high picture quality frame number HQ_frame_num[i] by using equation (17). Further, number i of frames that have been determined to be in a high picture quality is incremented by 1, frame number prev_hq_num that has been just determined to be encoded in a high picture quality is updated by equation (18), and step S102 is executed.

$$HQ\_frame\_num[i]=prev\_hq\_num+S \quad (17), \text{ and}$$

$$prev\_hq\_num=HQ\_frame\_num[i] \quad (18).$$

After the above processes, picture quality determination unit 1121 turns HQ_flag on when HQ_num is not less than 1 and turns HQ_flag off when less than 1.

Figure 6:
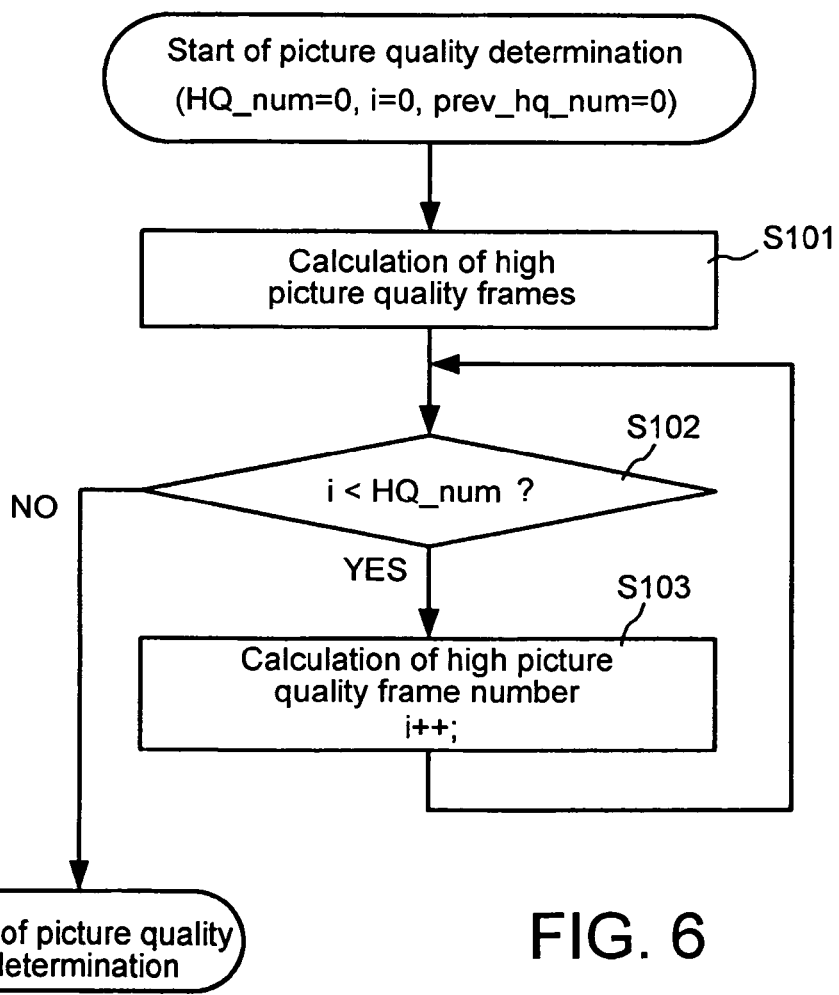
FIG. 6 is a flowchart showing a picture quality determination process.

In the moving picture encoding apparatus of the present embodiment, according to the process shown in FIG. 6, the reference frame to be referred when another frame is encoded, is encoded in a high picture quality at interval S. Because S is not more than interval MAX_REF of previousmost frame that can be referred in the multi-frame prediction, the motion prediction can be necessarily performed in all subject frames to be encoded while referring to frames that are encoded in the high picture quality.

Figure 7:
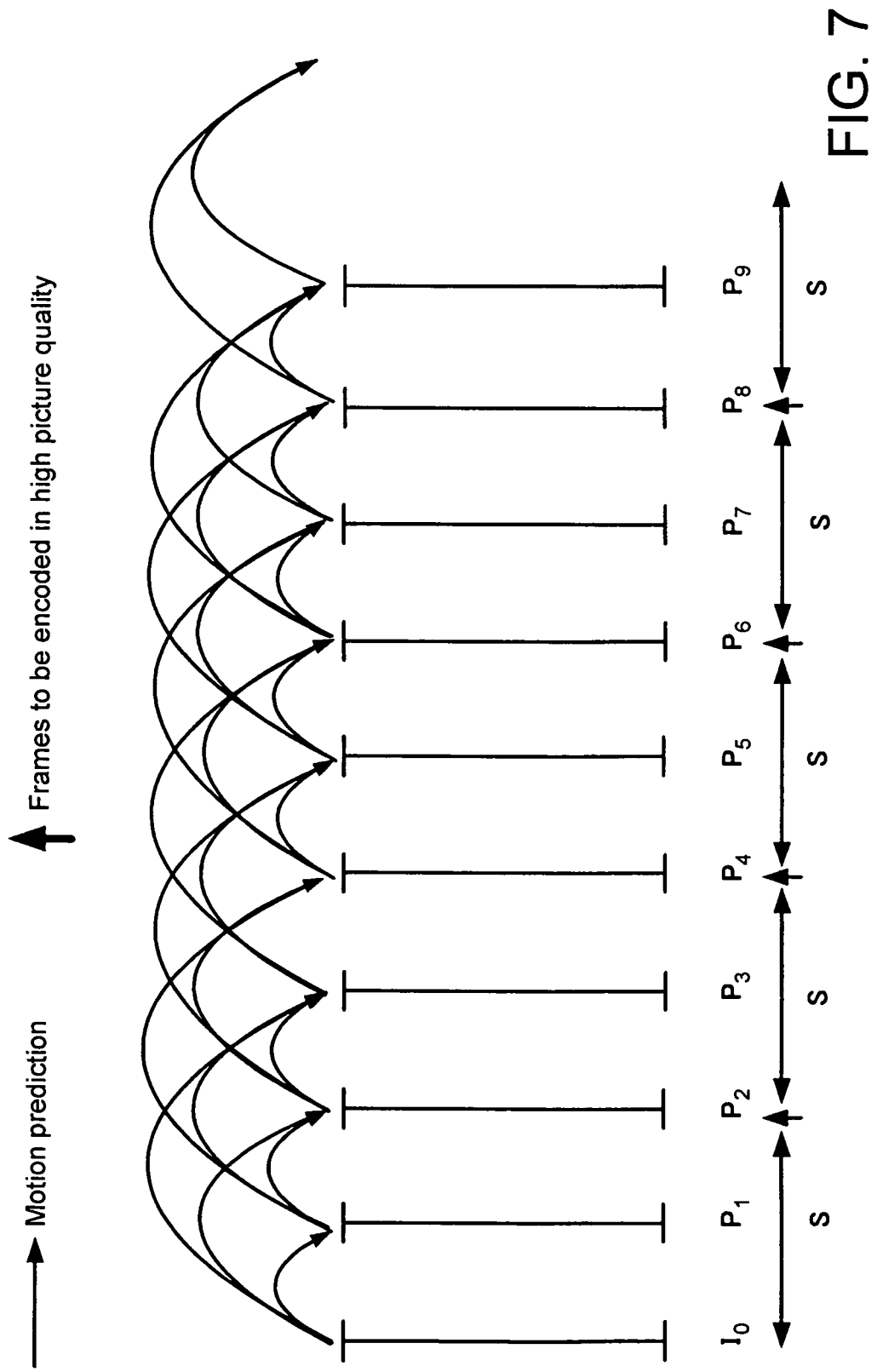
FIG. 7 is a view for explaining a frame to be encoded in a high picture quality.

As an example, FIG. 7 shows frames to be encoded in the high picture quality according to the method of the present embodiment, in the case of N=10, MAX_REF=3, and S=2. In this case, each frame of $P_2$, $P_4$, $P_6$, $P_8$ is encoded in a high picture quality.

Figure 8:
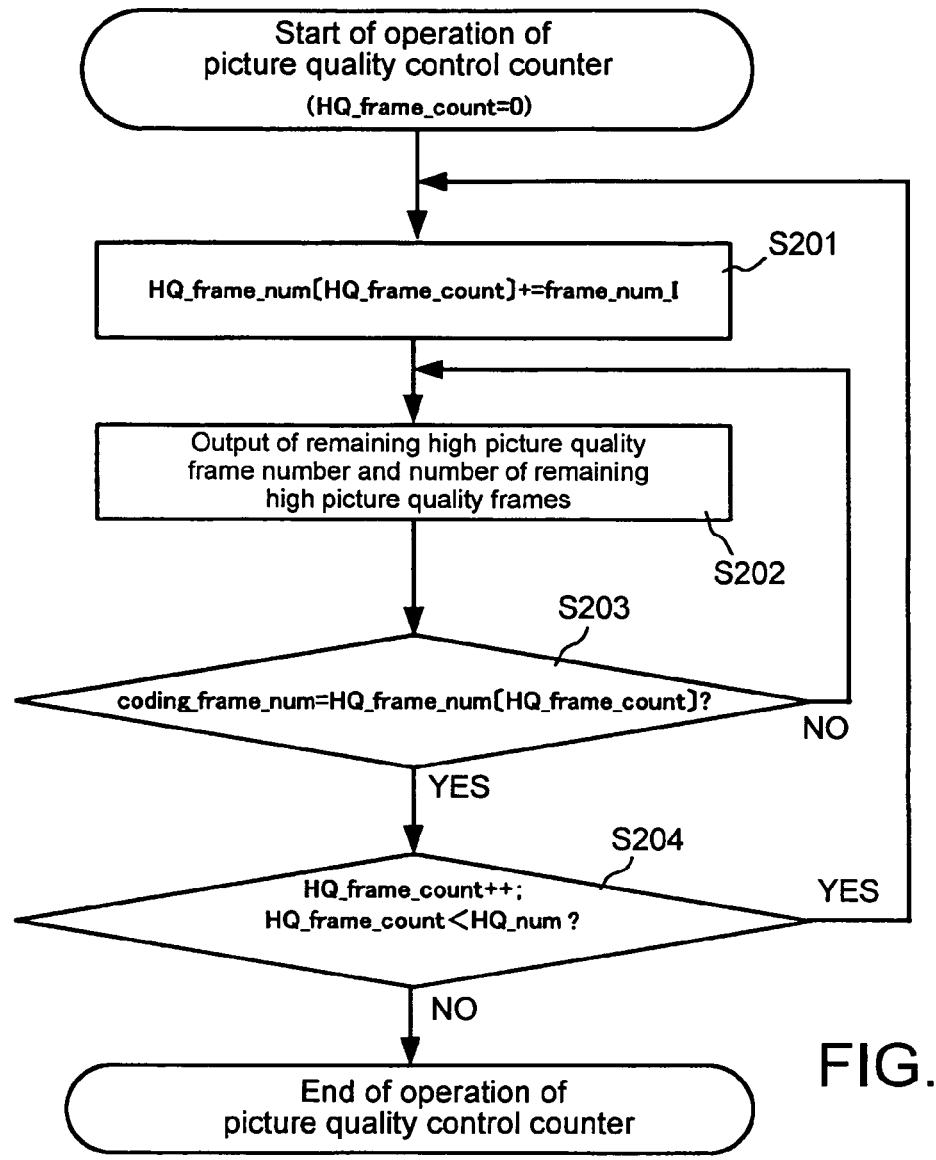
FIG. 8 is a flowchart showing a picture quality control counter process.

Picture quality control counter 1122 calculates number of remaining high picture quality frames R_HQ_num and remaining high picture quality frame number R_HQ_frame_num in accordance with frame number coding_frame_num supplied from code amount control unit 111 and number of high picture quality frames HQ_num and high quality frame number HQ_frame_num[HQ_num] supplied from picture quality determination unit 1122, and outputs them to code amount control unit 111. Picture quality control counter 1122 operates only when number of high picture quality frames HQ_num is not less than 1. Here, the frame number of I-picture at the head of GOP is represented by frame_num_I, high picture quality frame counter HQ_frame_count is set to 0, and the operation of picture quality control counter 1122 is explained with reference to FIG. 8.

In step S201, picture quality control counter 1122 adds frame_num_I to high picture quality frame number HQ_frame_num[HQ_frame_count] supplied from picture quality determination unit 1121. This operation is performed to synchronize frame number coding_frame_num in being encoded, supplied from code amount control unit 111, with the frame number to be encoded in a high picture quality.

In step S202, picture quality control counter 1122 takes HQ_frame_num[HQ_frame_count] as remaining high picture quality frame number R_HQ_frame_num and outputs (HQ_num−HQ_frame_count) as number of remaining high picture quality frames R_HQ_num. Then, in step S203, picture quality control counter 1122 determines whether or not frame number coding_frame_num is synchronized with high picture quality frame number HQ_frame_num[HQ_frame_count]. When they are synchronized, the process is advanced to step S204, and when they are not synchronized, the process is returned to step S202.

In step S204, picture quality control counter 1122 increments HQ_frame_count by 1 and determines whether or not HQ_frame_count is smaller than HQ_num. When HQ_frame_count is smaller than HQ_num, the process is advanced to step S201, and when not smaller, the process is finished.

As described above, picture quality control counter 1122 outputs remaining high picture quality frame number R_HQ_frame_num and number of remaining high picture quality frames R_HQ_num to code amount control unit 111.

Figure 9:
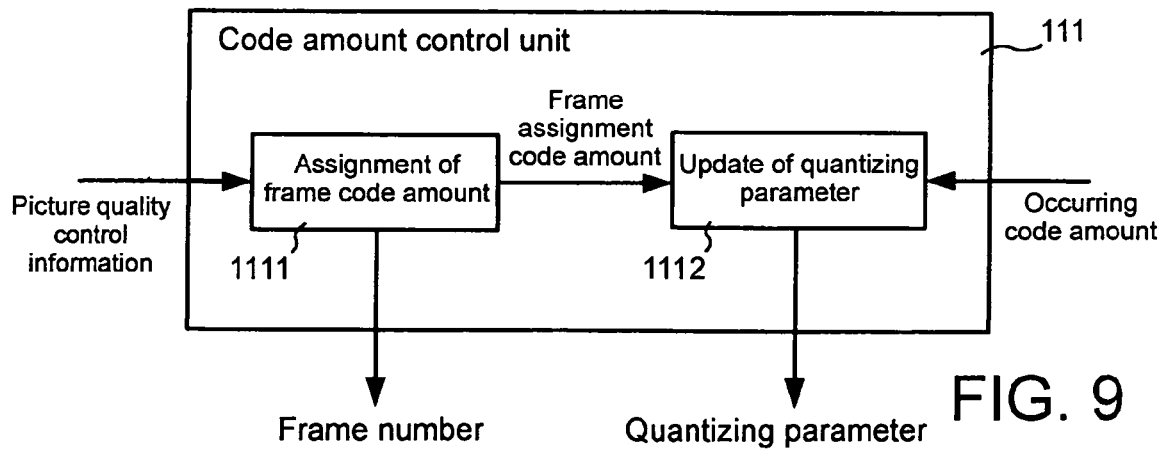
FIG. 9 is a block diagram showing a configuration of a code amount control unit.

Code amount control unit 111, as shown in FIG. 9, frame code amount assignment unit 1111 and quantizing parameter update unit 1112. Code amount control unit 111 in the present embodiment is different from the code amount control unit in the conventional moving picture encoding apparatus shown in FIG. 1 in the operation of frame code amount assignment unit 1111.

Frame code amount assignment unit 111 in the present embodiment calculates a code amount assigned to each frame by using the picture quality control information (high picture quality flag HQ_flg, number of remaining high picture quality frames R_HQ_num, and remaining high picture quality frame number R_HQ_frame_num) supplied from picture quality control unit 112 and supplies the code amount to quantizing parameter update unit 1112. Quantizing parameter update unit 1112 calculates a quantizing parameter by using the frame assignment code amount supplied from frame code amount assignment unit 1111 and the occurring code amount supplied from buffer 110 and supplies the quantizing parameter to variable length encoding unit 103.

The operation of frame code amount assignment unit 1111 is explained below. In the following explanations, it is assumed that target code amounts Ti, Tp are target code amounts by picture type, R is a code amount assigned to frames that have not been encoded in GOP, Np is the number of P-pictures that have not been encoded in GOP, Xi is screen complexity of I-picture that is finally encoded, Xp is screen complexity of P-picture that is finally encoded, and Kp is a parameter by picture type in consideration of the subjective picture quality.

Figure 10:
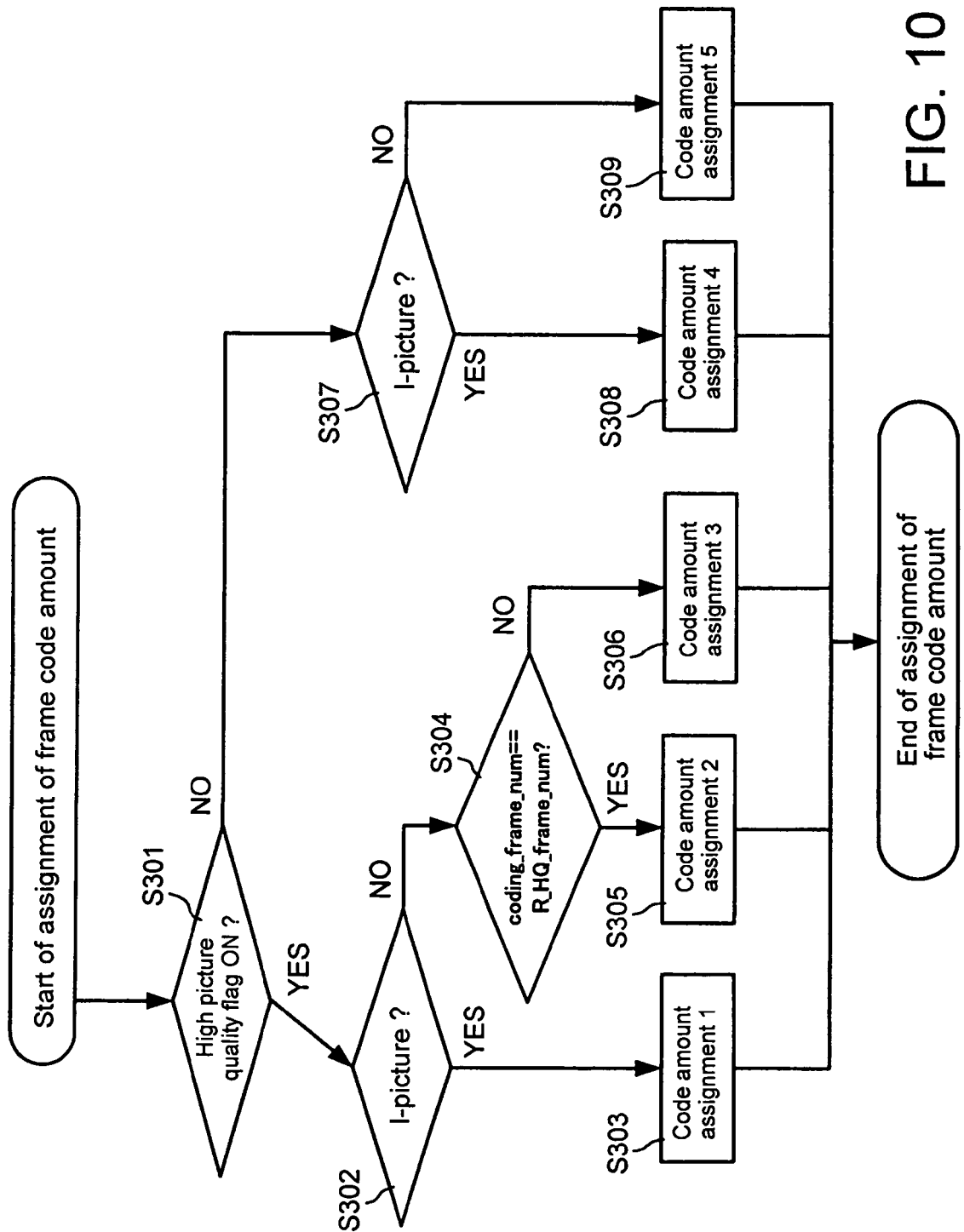
FIG. 10 is a flowchart showing a process for assigning a code amount to a frame.

FIG. 10 shows the operation of frame code assignment unit 1111 according to the first embodiment.

First, in step S301, frame code amount assignment unit 1111 determines whether high picture quality flag HQ_flg supplied from picture quality control unit 112 is turned on or off. When high picture quality flag HQ_flg is turned on, the process is advanced to step S302, and when off, the process is advanced to step S307.

In step S302, it is determined whether or not the frame to be being encoded is I-picture. When the subject frame to be encoded is I-picture, the process is advanced to step S303, and when not I-picture, the process is advanced to step S304.

In step S303, frame code amount assignment unit 1111 calculates code amount Ti for I-picture that is being coded, by equation (19) and finishes the frame code amount assignment.

$$Ti=R/(1+Np\times Xp/Xi)+\text{additional\_}Ti \quad (19),$$

$$\text{additional\_}Ti=\text{residu1\_bit1}\times Xi/Xgop2 \quad (20),$$

$$\text{residu\_bit1}=(\text{margin\_ratio}\times R\times (Np-R\_HQ\_num)\times Xp)/(Kp\times Xgop1) \quad (21),$$

$$Xgop1=Xi+Np\times Xp/Kp \quad (22), \text{ and}$$

$$Xgop2=Xi+R\_HQ\_num \times Xp/Kp \quad (23).$$

Where, margin_ratio is a number not more than 1.

In this case, since the number of bits more then the conventional art by additional_Ti is assigned to the I-frame, the picture quality of this frame is improved. Accordingly, the effects of the frame motion prediction that refers to this frame are improved.

In step S304, frame code amount assignment unit 1111 determines whether or not frame number coding_frame_num of P-picture that is being encoded is synchronized with remaining high picture quality frame number R_HQ_frame_num supplied from picture quality control unit 112. When they are synchronized, the process is advanced to step S305, and when not synchronized, the process is advanced to step S306.

In step S305, frame code amount assignment unit 1111 calculates the code amount for P-picture that is being encoded by equation (24) and finishes the frame code amount assignment.

$$Tp=R/Np+\text{additional\_}Tp \quad (24), \text{ and}$$

$$\text{additional\_}Tp=(\text{margin\_ratio}\times R\times (Np-R\_HQ\_num))/(Np\times R\_HQ\_num) \quad (25).$$

In this case, since the number of bits more then the conventional art by additional_Tp is assigned to P-frame, the picture quality of this frame is improved. Accordingly, the effects of the frame motion prediction that refers to this frame are also improved.

In step S306, frame code amount assignment unit 1111 calculates the code amount for P-picture that is being encoded by equation (26) and finishes the frame code amount assignment.

$$Tp=(1-\text{margin\_ratio})\times R/Np \quad (26).$$

In this case, since the code amount assigned to the frame is decreased by margin_ratio, it is considered that the picture quality of this frame is lowered. However, since the motion prediction can be performed by control of picture quality control unit 112 while referring to the frames encoded in the high picture quality, the picture quality can be prevented from lowering by improvement of motion prediction performance, even if the assigned code amount is small.

In step S307, frame code amount assignment unit 1111 determines whether or not the frame that is being encoded is I-picture. When the subject frame to be encoded is I-picture, the process is advanced to step S308, and when not I-picture, the process is advanced to step S309.

In step S308, frame code amount assignment unit 1111 calculates the code amount for I-picture that is being encoded by equation (27) and finishes the frame code amount assignment.

$$Ti=R/(1+Np\times Xp/Xi) \quad (27).$$

Similarly, in step S309, frame code amount assignment unit 1111 calculates the code amount for P-picture that is being encoded by equation (28) and finishes the frame code amount assignment.

$$Tp=R/Np \quad (28).$$

According to the code amount assignment, as described above, all frames can refer to the frames encoded in the high picture quality by using the degree of freedom of the motion prediction in the multi-frame motion prediction. With this arrangement, according to the present embodiment, since the effects of the motion prediction of the whole scene are improved, moving pictures can be encoded in a high picture quality.

Figure 11:
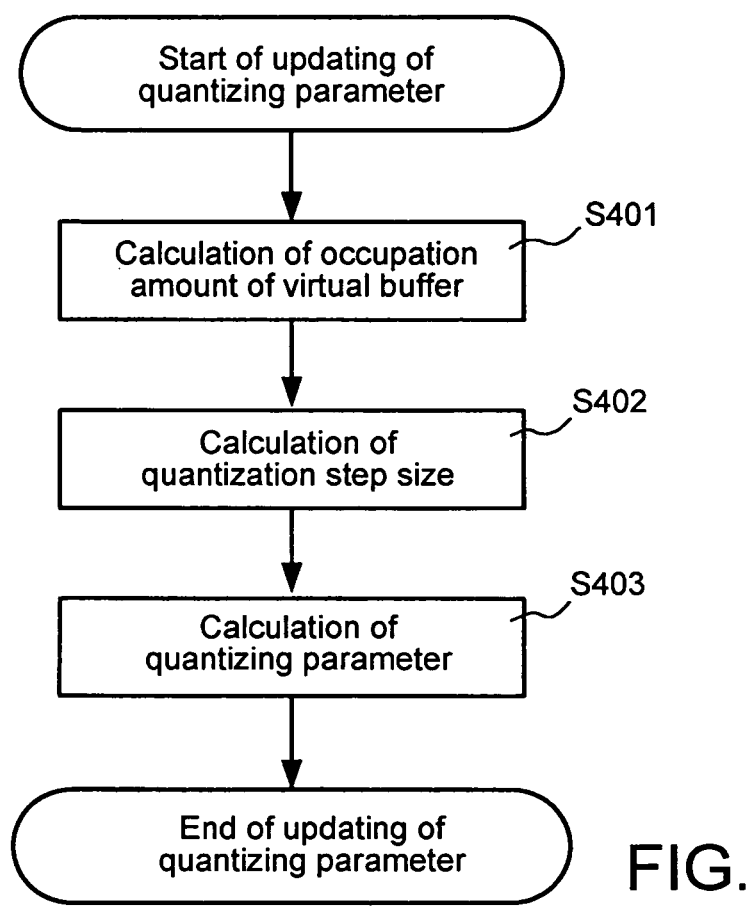
FIG. 11 is a flowchart showing a process for updating a quantizing parameter.

Quantizing parameter update unit 1112 performs feedback control to a quantizing parameter by macroblock, based on the virtual buffer capacity that is set for each picture type, in order to match code amounts Ti, Tp that are assigned to respective frames and are obtained in frame code amount assignment unit 1111 with the actual occurring code amounts. FIG. 11 is a flowchart of updating the quantizing parameter.

First, in step S401, quantizing parameter update unit 1112 calculates an occupation amount of the virtual buffer by picture type with equation (29) prior to encoding of the j-th macroblock.

$$di,p(j)=di,p(0)+B(j-1)-Ti,p\times(j-1)/MB\text{count} \quad (29).$$

Where di,p(0) is an initial occupation amount in the virtual buffer by picture type, B(j) is an occurring code amount from the head of the frame to the j-th macroblock, and MBcount is the number of macroblocks in the frame. Needless to say, the initial occupation amount in the virtual buffer for I-picture is di(0) and that for P-picture is dp(0).

At the completion of encoding each frame, initial occupation amounts di,p(MBcount) in the virtual buffer by picture type are used as initial occupation amounts di,p(0) in the virtual buffer for the next picture.

Then, in step S402, quantizing parameter update unit 1112 calculates the quantization step size relative to the j-th macroblock by equation (30).

$$Q\text{step}=Qi,p\times di,p(j)\times 31/(10\times r) \quad (30), \text{ and}$$

$$Qi,p=Xi,p/Ti,p \quad (31).$$

With control by frame code amount assignment unit 1111, assignment code amounts Ti,p of frames to be encoded in the high picture quality become larger than those of the conventional art. Therefore, as is apparent from equation (31), quantization step sizes Qi,p of high picture quality frames are small and the frames are encoded in the high picture quality. Accordingly, the average quantizing parameter of the frames of the bitstream to be output provides small values at frame intervals of S.

Here, r is a parameter, called a reaction parameter, for controlling the response speed of the feedback loop, and is given by equation (32).

$$r=2\times \text{bit\_rate/frame\_rate} \quad (32).$$

Incidentally, at start of encoding, initial occupation amounts di,p(0) of the virtual buffer for each picture type are given by equations (33), (34).

$$di(0)=10\times r/31 \quad (33), \text{ and}$$

$$dp(0)=Kp\times di(0) \quad (34).$$

Then, in step S403, quantizing parameter update unit 1112 detects quantizing parameter Q corresponding to quantization step size Qstep from a quantization table. When there is no quantization step size Qstep in the quantization table, quantizing parameter Q of the quantization step size closest to quantization step size Qstep is output.

As described above, the moving picture encoding apparatus according to the first embodiment encodes a frame having high priority as a reference frame in a high picture quality, whereby the code amount control is performed so that the effects of the motion prediction of the whole scene are improved.

Figure 12:
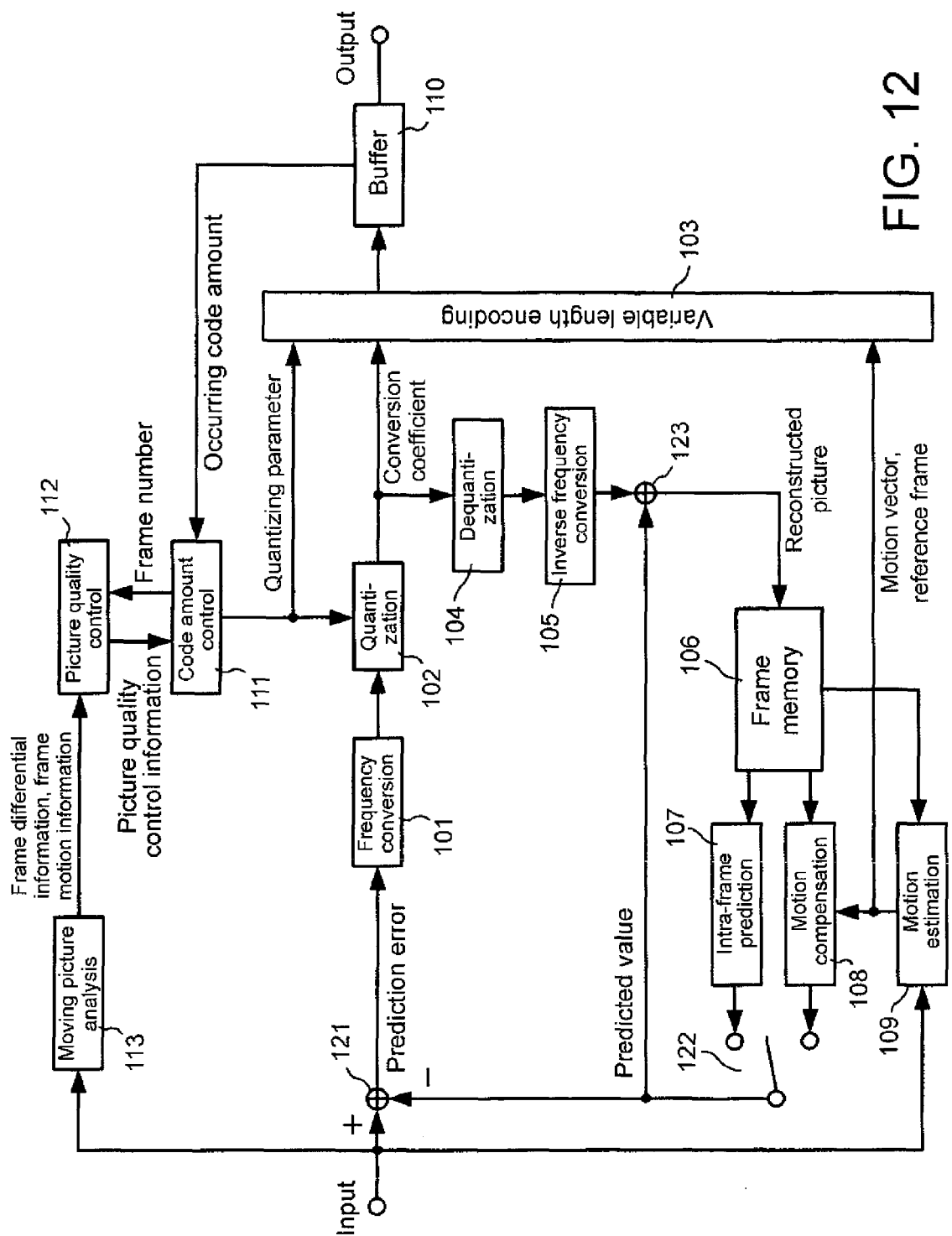
FIG. 12 is a block diagram showing a configuration of a moving picture encoding apparatus according to a second embodiment of the present invention.

Next, explanations are given of a moving picture encoding apparatus according to the second embodiment of the present invention. A moving picture encoding apparatus according to the second embodiment of the present invention, shown in FIG. 12, further includes moving picture analysis unit 113 which performs analysis of a moving picture in addition to the moving picture encoding apparatus according to the first embodiment shown in FIG. 4. Moving picture analysis unit 113 outputs frame differential information and frame motion information, and picture quality control unit 112 generates picture quality control information by further using the frame differential information and the frame motion information. Therefore, in the moving picture encoding apparatus according to the second embodiment, moving picture analysis unit 113 and picture quality control unit 112 are intensively explained. Incidentally, in the second embodiment, explanations are given of a case where I-picture and P-picture are used as picture types to encode frames.

Figure 13:
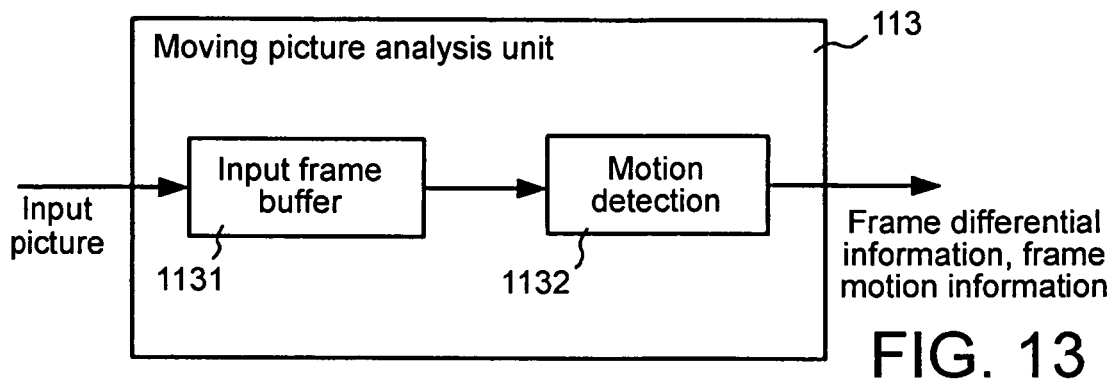
FIG. 13 is a block diagram showing a configuration of a moving picture analysis unit.

Moving picture analysis unit 113 calculates the frame differential information and the frame motion information from the input picture, supplies the calculated information to picture quality control unit 112, and includes input frame buffer 1131 and motion detection unit 1132, as shown in FIG. 13.

Input frame buffer 1131 foresees N-pieces of input moving picture frames, allocates numbers to respective frames in ascending order, and is stored with the frames. The number of frames to be foreseen is arbitrary, and, for example, it can be considered that the GOP interval used in MPEG is used as N.

Figure 14:
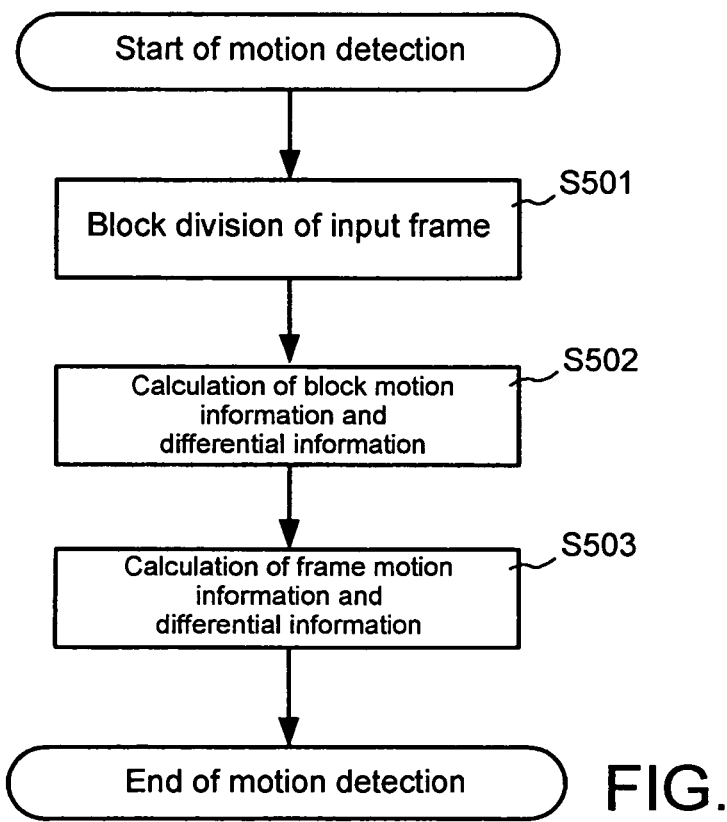
FIG. 14 is a flowchart showing a motion detection process.

Motion detection unit 1132 calculates the frame motion information and frame differential information of each frame in accordance with the frames stored in input frame buffer 1132. The operation of motion detection unit 1132 is explained below with reference to FIG. 14. Motion detection unit 1132 performs each step shown in FIG. 14 for each frame, which is foreseen.

First, in step S501, motion detection unit 1132 divides the frame into blocks of w×h in size smaller than the frame size of W×H, and, in step S 502, calculates block motion information MVX, MVY and block differential information D of the blocks to form the frame in accordance with the following process.

A pixel value at coordinate (x, y) in the cur-th frame is set as F(cur, x, y), the k-th divided block in the cur-th frame is set as B(cur, k), and a coordinate at the upper-left corner of B(cur, k) in the frame is set as (bx(cur, k), by(cur, k)).

Block motion information MVX(cur, k, ref), MVY(cur, k, ref) and differential information D(cur, k, ref) of block (cur, k) in the cur-th frame, relative to a previous frame from that frame by ref-pieces, i.e., (cur−ref)-th frame, are given by mvx, mvy that minimize diff(ref, mvx, mvy) in equation (35) and minimized diff(ref, MVX(cur, k, ref), MVY(cur, k, ref)).

$$diff(ref, mvx, mvy) = \sum_{i=0, j=0}^{i=w-1, j=h-1} absref\_pixel \begin{pmatrix} (cur\_pixel(i, j) - (ref, i + \\ mvx, j + mvy)) \end{pmatrix}, \quad (35)$$

$$cur\_pixel(i, j) = F(cur, bx(cur, k)+i, by(cur, k)+j) \quad (36), \text{ and}$$

$$ref\_pixel(ref, i, j) = F(cur-ref, bx(cur, k)+i, by(cur, k+j)) \quad (37).$$

Then, in step S503, motion detection unit 1132 calculates the frame motion information and the frame differential information from block motion information MVX, MVY and block differential information D.

When the number of blocks in the frame is set as block_num, frame motion information FMVj(i) and frame differential information FDj(i) of the i-th frame relative to the (i−j)-th frame are given by equations (38) and (39).

$$FMVj(i) = \sum_{n=0}^{block\_num-1} (abs(MVX(i, n, j) + MVY(i, n, j))), \quad (38)$$

$$FDj(i) = \sum_{n=0}^{block\_num-1} D(i, n, j). \quad (39)$$

Motion detection unit 1132 performs the above-mentioned process for each frame i (1≤i≤N−1) and each reference frame ref (1≤ref≤MAX_REF) and calculates the frame differential information and the frame motion information between all the input frames and the reference frames.

Figure 15:
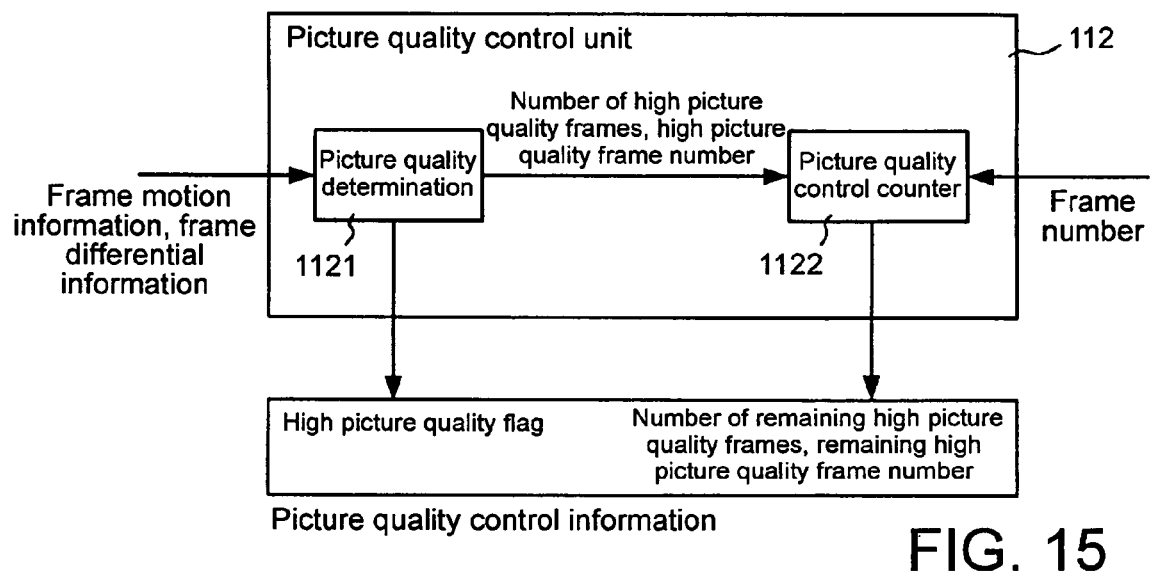
FIG. 15 is a block diagram showing a configuration of a picture quality control unit.

Picture quality control unit 112, as shown in FIG. 15, includes picture quality determination unit 1121 and picture quality control counter 1122. Picture quality control information supplied from picture quality control unit 112 includes a high picture quality flag, the number of remaining high picture quality frames, and a remaining high picture quality frame number. Picture quality control unit 112 of the present embodiment is different from picture quality control unit 112 of the first embodiment, as described above, in the operation of picture quality determination unit 1121. Therefore, the operation of picture quality determination unit 1121 according to the second embodiment is explained below.

Figure 16:
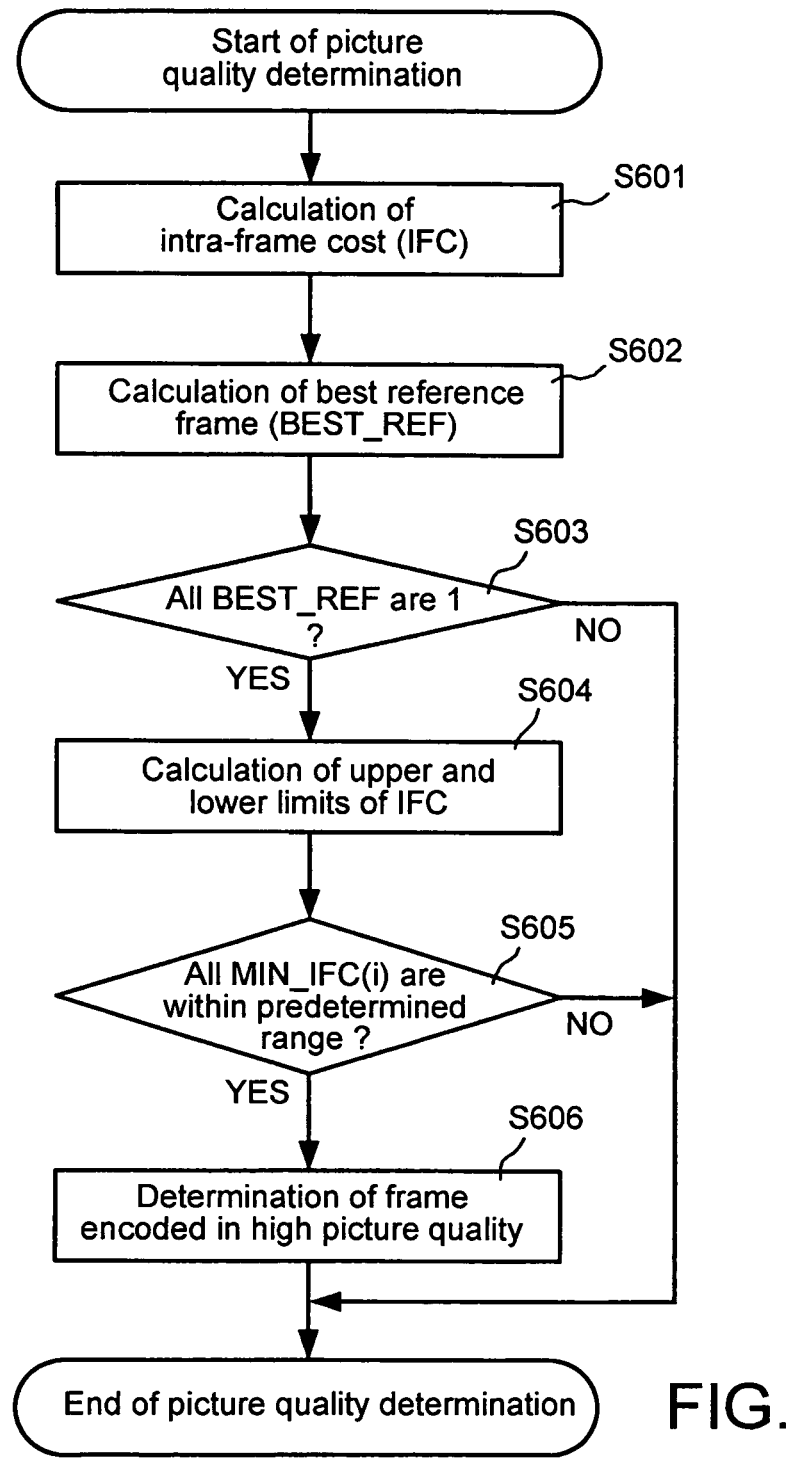
FIG. 16 is a flowchart showing a picture quality determination process.

Picture quality determination unit 1121 calculates the high picture quality flag, the number of high picture quality frames, and the high picture quality frame number in accordance with the frame differential information and the frame motion information supplied from moving picture analysis unit 112. The high picture quality flag is output to code amount control unit 111, and the number of high picture quality frames and the high picture quality frame number are output to picture quality control counter 1122. The operation of picture quality determination unit 1121 according to the present embodiment is explained below with reference to FIG. 16.

First, in step S601, picture quality determination unit 1121 calculates inter-frame cost IFC(i) of each frame i and reference frame j by using equation (40). α is a value depending on the average quantizing parameter of the frame.

$$IFCj(i) = FDj(i) + \alpha \times FMVj(i), \quad (40)$$

$$MIN\_IFC(i) = \min_{\arg 1 \leq j \leq MAX\_REF} \{IFCj(i)\}. \quad (41)$$

Then, in step S602, picture quality determination unit 1121 calculates minimum inter-frame cost MIN_IFC(i) (1≤i≤N−1) by using equation (41) and obtains best reference frame BEST_REF(i) corresponding to MIN_IFC(i). Here, MAX_REF is an interval between the subject frame to be encoded and the previous-most frame that can be referred in the multi-frame prediction.

In step S603, picture quality determination unit 1121 determines whether or not BEST_REF(i) (1≤i≤N−1) of all frames are 1. As shown in FIG. 17A, when BEST_REF(i) of all frames are 1, a continuous scene is predicted without momentary picture fluctuations, such as a scene change and a flash, in N-pieces of analysis sections. On the other hand, as shown in FIG. 17B, when there is a frames of which BEST_REF(i) are not 1, a discontinuous scene is predicted with a scene change and a flash in N-pieces of analysis sections. Therefore, when all BEST_REF(i) are 1 in step S603, the process is advanced to step S604, and when all BEST_REF(i) are not 1, the high picture quality flag is turned off and the number of high picture quality frames is set to 0, and then the process is finished.

In step S604, picture quality control unit 112 calculates average inter-frame cost AVERAGE_IFC, inter-frame cost upper limit IFC_UPPER_LIMIT, and inter-frame cost lower limit IFC_LOWER_LIMIT in accordance with MIN_IFC(i) (==IFC1(i)) of all frames by equations (42) to (44). Here, margin_ratio is a value not more than 1.

$$AVERAGE\_IFC = \sum_{i=1}^{N-1} MIN\_IFC(i)/(N-1), \quad (42)$$

$$IFC\_UPPER\_LIMIT = (1+\text{margin\_ratio}) \times AVERAGE\_IFC \quad (43), \text{ and}$$

$$IFC\_LOWER\_LIMIT = (1-\text{margin\_ratio}) \times AVERAGE\_IFC \quad (44).$$

Then, in step S605, picture quality control unit 112 analyzes whether or not MIN_IFC(i) (1≤i≤N−1) of all frames are within a range between IFC_LOWER_LIMIT and IFC_UPPER_LIMIT. When MIN_IFC(i) of all N−1 pieces of picture frames are within the above-mentioned range, as shown in FIG. 18A, the difficulty of the inter-frame prediction is stable, and when not within the range, the difficulty is unstable, as shown in FIG. 18B.

Therefore, picture quality control unit 112 turns the high picture quality flag on and advances the process to step S606 when MIN_IFC(i) of all frames are within the above-mentioned range in step S605. Otherwise, picture quality control unit 112 turns the high picture quality flag off, sets the number of high picture quality frames to 0, and terminates the following process.

In step S606, picture quality control unit 112 adaptively calculates frame interval S to be encoded in a high picture quality within SS in accordance with the process, which will be described later, while maximum high picture quality frame interval set by GOP or scene is represented by SS. In this description, maximum high picture quality frame interval SS is a value not more than the interval between the subject frame to be encoded and the previous-most frame that can be referred in the multi-frame prediction and is suitably set in accordance with the motion speed and the frame rate after moving picture compression.

Figure 19:
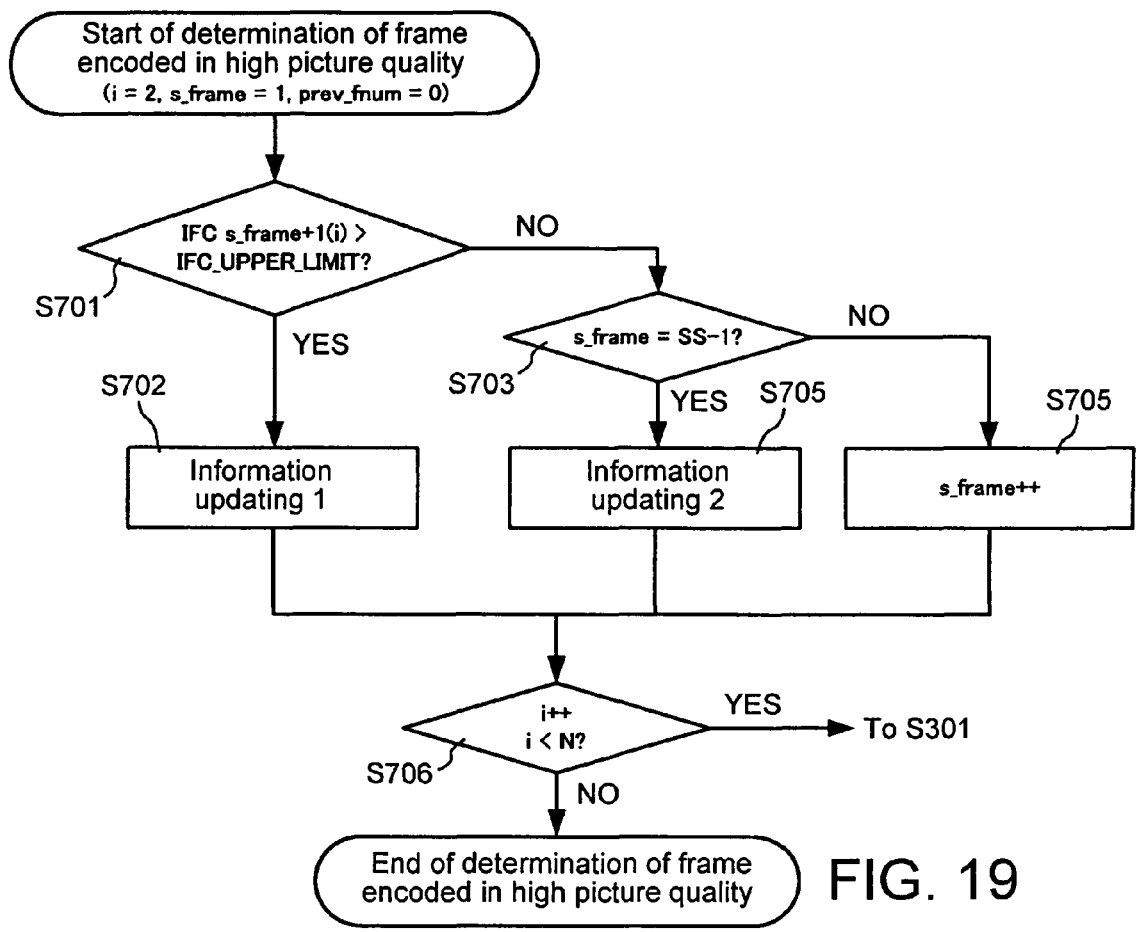
FIG. 19 is a flowchart showing a process for determining a frame encoded in a high picture quality.

The number of continuous frames not over IFC_UPPER_LIMIT is represented by s_frame, frame number that has been just determined to be encoded in a high picture quality is represented by prev_fnum, and frame number in picture quality determination process is represented by i, and an example of the calculation method for the number of high picture quality frames HQ_num and high picture quality frame number HQ_frame_num[N−1] is shown with reference to FIG. 19. In this example, the initial value of s_frame is 1, the initial value of prev_fnum is 0, the initial value of i is 2, and the initial value of HQ_num is 0.

FIG. 19 shows the process in step S606 in further details.

First, in step S701, picture quality control unit 112 determines whether or not IFCs_frame+1(i) is larger than IFC_UPPER_LIMIT, advances the process to step S702 when IFCs_frame+1(i) is larger than IFC_UPPER_LIMIT, and advances the process to step S707 when not larger.

In step S702, picture quality control unit 112 obtains the high picture quality frame number in accordance with equation (45), updates prev_fnum, HQ_num, and s_frame in accordance with equations (46) to (48), and advances the process to step S706.

$$HQ\_frame\_num[hq\_num] = prev\_fnum + s\_frame \quad (45),$$

$$prev\_fnum = HQ\_frame\_num[hq\_num] \quad (46),$$

$$HQ\_fnum = HQ\_fnum + 1 \quad (47), \text{ and}$$

$$s\_frame = 1 \quad (48).$$

In step S703, picture quality control unit 112 determines whether or not s_frame is equal to SS-1, advances the process to step S704 when equal, and advances the process to step S705 when not equal.

In step S704, picture quality control unit 112 obtains the high picture quality frame number in accordance with equation (45) while setting s_frame=SS, updates prev_fnum, HQ_num, and s_frame in accordance with equations (46) to (48), and increments frame number i by 1. Then, the process is advanced to step S706.

In step S705, picture quality control unit 112 increments s_frame by 1, and advances the process to step S706.

In step S706, picture quality control unit 112 increments frame number i to be processed by 1, determines whether or not i is smaller than number N of foreseeing frames, and advances the process to step S701 when small and finishes the process when not small.

With the above-mentioned process, while all the subject frames to be encoded refer to the frames that are coded in the high picture quality without exception, the motion prediction becomes possible. Incidentally, when HQ_num obtained by the above-mentioned picture quality determination process is equal to N−1, namely, when it is determined that all frames are encoded in the high picture quality, HQ_num is reset to 0, the high picture quality flag is turned off, and the number of high picture quality frames is set to 0.

Figure 20:
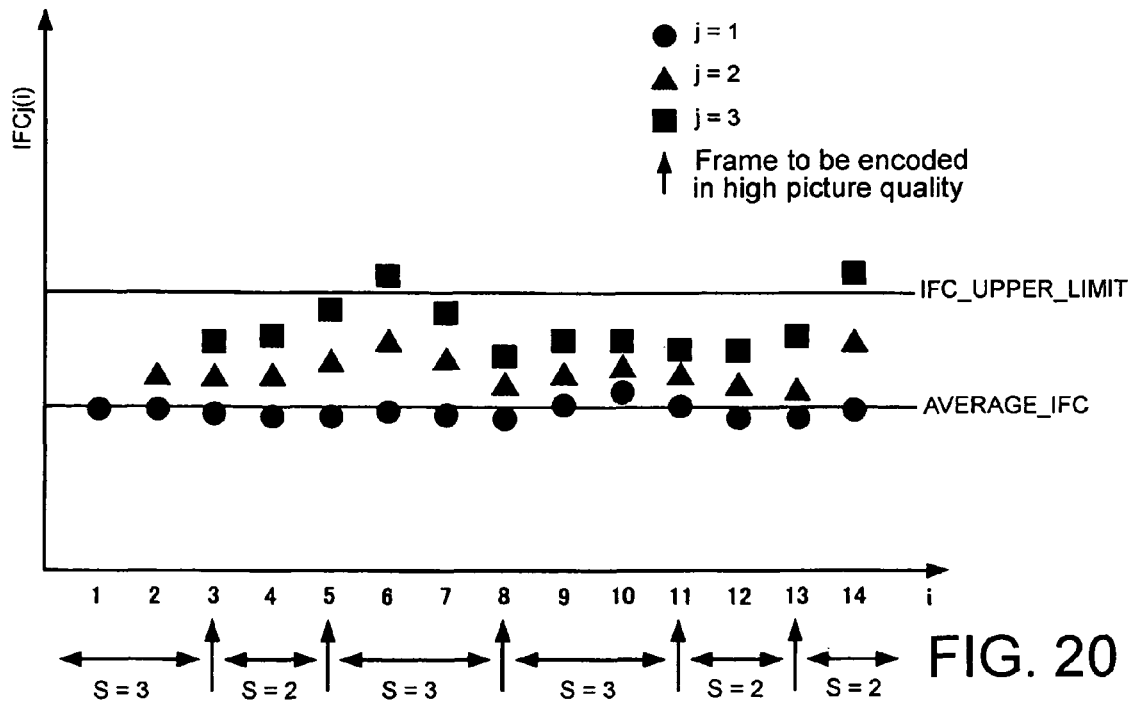
FIG. 20 is a view for explaining a frame to be encoded in a high picture quality.

FIG. 20 shows an example in that the above-mentioned high picture quality encoding frame determination is executed when N=15, REF_NUM=3, and the leading frame, that is, 0-th frame, is I-picture. According to the present embodiment, frame interval S to be coded in the high picture quality is updated adaptively.

As described above, according to the second embodiment, moving picture analysis unit 113 is arranged, thereby selecting the frame to be encoded in the high picture quality with accuracy, in consideration of momentary picture fluctuations, such as a scene change and a flash, in GOP, i.e., rapid reduction of pixel correlation between continuous frames and the effects of large fluctuations in encoding difficulty of the scene. Accordingly, according to the present embodiment, moving pictures can be encoded a still higher picture quality.

Also, there is no limitation on the above-mentioned method of selecting frames to be encoded in the high picture quality. For example, a simple embodiment using inter-frame cost IFC(i) is available. For example, when the interval between the subject frame to be encoded and the previous-most frame that can be referred in the multi-frame prediction is MAX_REF, high picture quality frame number R_HQ_frame_num that has been just encoded in the high picture quality is regarded as one of reference frames and, in frame number (R_HQ_frame_num+m) where m≤MAX_REF, a frame of which inter-frame cost IFC(i) relative to the high picture quality reference frame is smaller than a predetermined threshold and which corresponds to maximum m can be set as the next high picture quality frame.

Next, explanations are given of a moving picture encoding apparatus according to the third embodiment of the present invention. In the third embodiment, I-picture, P-picture, and B-picture are used as picture types used to encode frames. The moving picture encoding apparatus of the third embodiment is configured similarly to the moving picture encoding apparatus of the first embodiment, however, the third embodiment is different from the first embodiment in the operations of picture quality control unit 112 and code amount control unit 111, because encoding is performed by using B-picture. Hereinafter, explanations are given of the operations of picture quality control unit 112 and code amount control unit 111 in to the third embodiment.

Picture quality control unit 112 includes picture quality determination unit 1121 and picture quality control counter 1122, similarly to the first embodiment. Picture quality control unit 112 supplies code amount control unit 111 with the high picture quality flag, the number of remaining high picture quality frames, and the high picture quality frame number, as the picture quality control information. The number of remaining high picture quality frames and the high picture quality frame number relate to P-picture frames in the first embodiment, whereas they relate to B-picture frames in the third embodiment. Accordingly, the third embodiment is different from the first embodiment only in the operation of picture quality determination unit 1121 in picture quality control unit 112.

Figure 21:
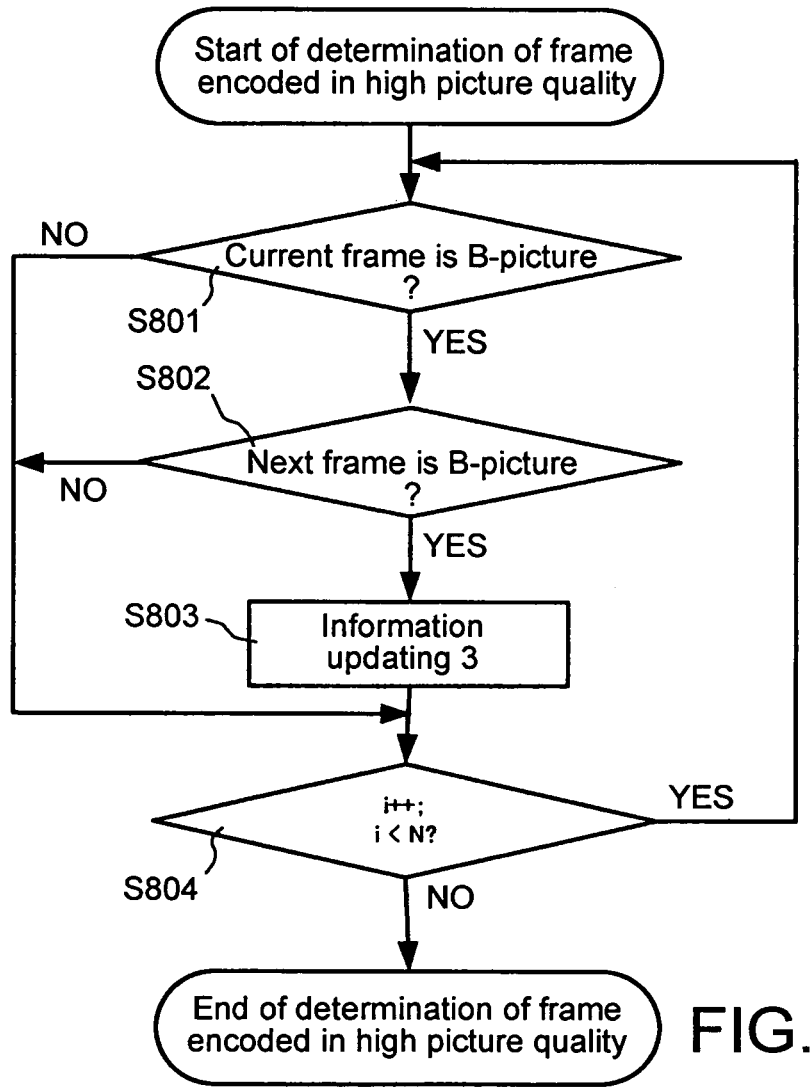
FIG. 21 is a flowchart showing a picture quality determination process.

Therefore, the operation of picture quality determination unit 1121 according to the third embodiment is explained with reference to FIG. 21.

The calculation procedure for number of high picture quality frames HQ_num and high picture quality frame number HQ_frame_num[HQ_num] is explained with reference to FIG. 21, when the number of frames included in GOP is set to N and the frame number in picture quality determination process is set to i. The initial value of i is 1 and the initial value of HQ_num is 0.

First, in step S801, picture quality determination unit 1121 determines whether or not the coding type of the i-th frame that is currently to be analyzed is B-picture. When the coding type is B-picture, the process is advanced to step S802, and when not B-picture, the process is advanced to step S804.

In step S802, picture quality determination unit 1121 determines whether or not the coding type of the successive (i+1)-th frame is B-picture. When the coding type is B-picture, the process is advanced to step S803, and when not B-picture, the process is advanced to step S804.

In step S803, picture quality determination unit 1121 stores the current i-th frame as a frame to be encoded in a high picture quality in accordance with equation (49) and updates the number of high picture quality frames in accordance with equation (50).

$$HQ\_frame\_num[HQ\_num]=i \quad (49), \text{ and}$$

$$HQ\_num=HQ\_num+1 \quad (50).$$

In step S804, picture quality determination unit 1121 increments the frame number i to be processed by 1 and determines whether or not frame number i is smaller than N. When frame number i is smaller than N, the process is returned to step S801, and when not smaller, the process is finished.

After completion of the above processes, picture quality determination unit 1121 turns high picture quality flag HQ_flg on when HQ_num is not less than 1, and turns HQ_flg off when HQ_num is less than 1.

Figure 22:
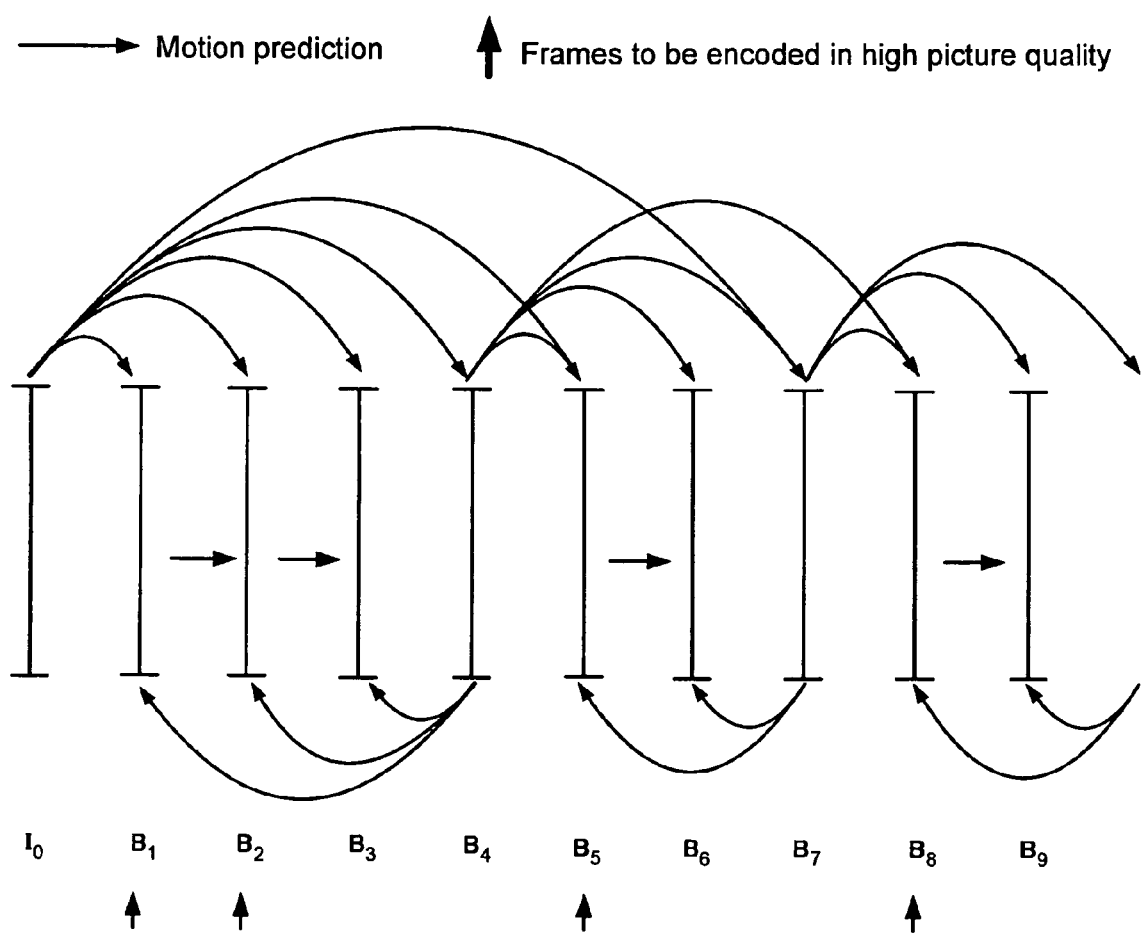
FIG. 22 is a view for explaining a frame to be encoded in a high picture quality.

With the above process, the frame that is to be referred and is encoded as B-picture is regarded as a high picture quality frame number. In other words, the reference frame can be encoded in the high picture quality. FIG. 22 shows an example of B-picture encoded in the high picture quality according to such a process.

Code amount control unit 111 includes frame code amount assignment unit 1111 and quantizing parameter update unit 1112, similarly to the first embodiment. Explanations are given of the operations of frame code amount assignment unit 1111 and quantizing parameter update unit 1112 in code amount control unit 111 according to the third embodiment.

Frame code amount assignment unit 1111 performs frame code amount assignment by using the picture quality control information supplied from picture quality control unit 112, i.e., the high picture quality flag, number of remaining high picture quality frames R_HQ_num, and remaining high picture quality frame number R_HQ_frame_num.

Figure 23:
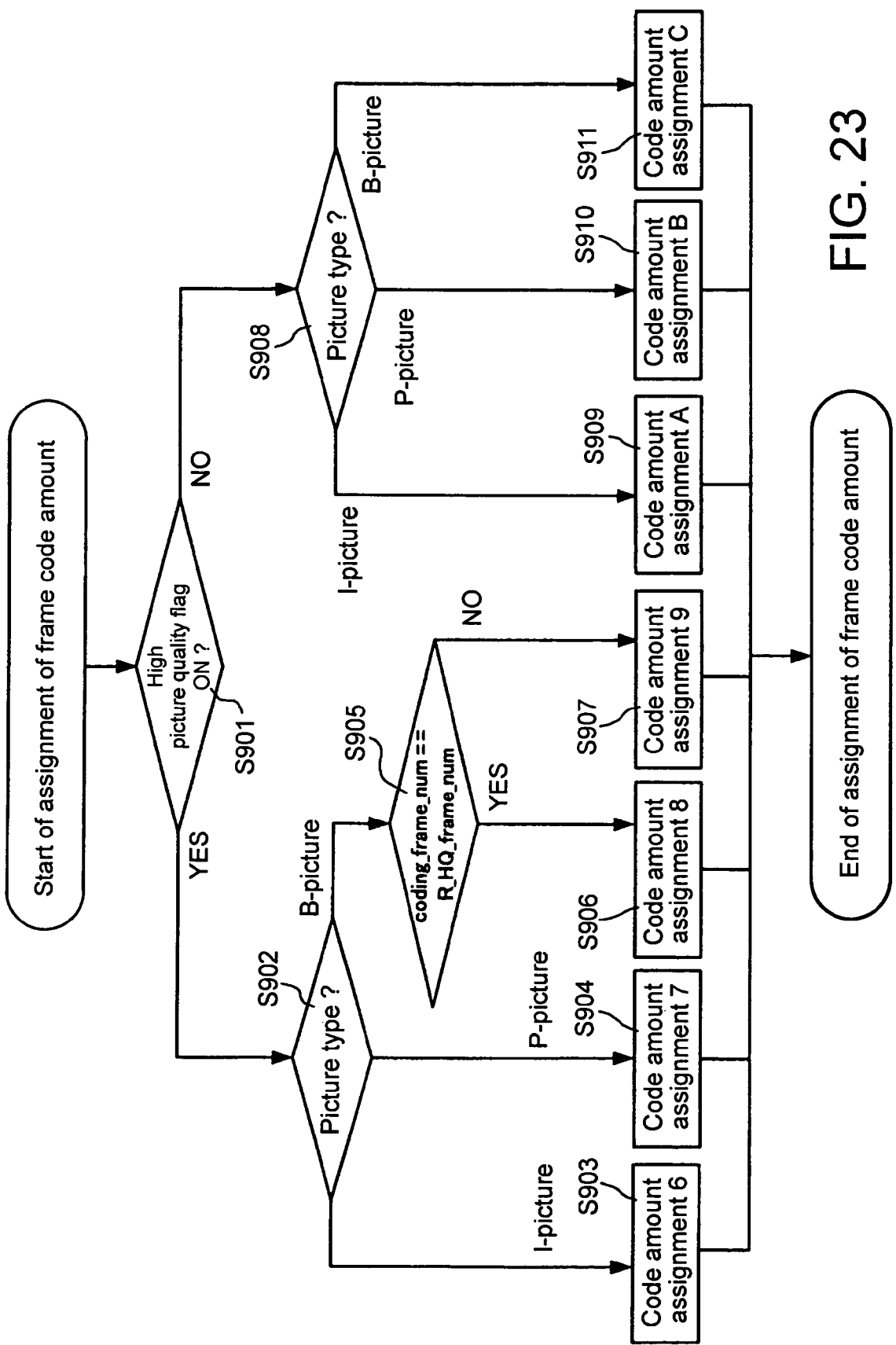
FIG. 23 is a flowchart showing a process for assigning a code amount to a frame.

Target code amounts Ti, Tp, Tb are regarded as target code amounts for respective picture types, R is regarded as a code amount assigned to frames that have not been encoded in GOP, Np and Nb are regarded as numbers of P-pictures and B-pictures that have not been encoded in GOP, Xi, Xp, Xp are regarded as screen complexity of each picture that is finally encoded, and Kp and Kb are parameters in consideration of subjective picture quality by picture type. FIG. 23 shows the operation of frame code amount assignment unit 1111 according to the third embodiment.

First, in step S901, frame code amount assignment unit 1111 determines whether high picture quality flag HQ_flg supplied from picture quality control unit 112 is turned on or off. When high picture quality flag HQ_flg is turned on, the process is advanced to step S 902, and when off, the process is advanced to step S908.

In step S902, frame code amount assignment unit 1111 determines the frame type of the frame, which is being encoded. In a case of I-picture, the process is advanced to step S903, in a case of P-picture, the process is advanced to step S904, and in the other case, i.e., in the case of B-picture, the process is advanced to step S905.

In step S903, frame code amount assignment unit 1111 calculates the code amount for I-picture, which is being encoded, in accordance with equation (51), and finishes the frame code amount assignment.

$$Ti=R/(1+Np\times Xp/(Kp\times Xi)+Nb\times Xb/(Kp\times Xi))+\text{additional\_}Ti \quad (51),$$

$$\text{additional\_}Ti=\text{residu\_bit3}\times Xi/Xgop4 \quad (52),$$

$$\text{residu\_bit3}=(\text{margin\_ratio}\times R\times(Nb-R\_HQ\_num)\times Xb)/(Kb\times Xgop3) \quad (53),$$

$$Xgop3=Xi+Np\times Xp/Kp+Nb\times Xb/Kb \quad (54), \text{ and}$$

$$Xgop4=Xi+Np\times Xp/Kp+(Nb-R\_HQ\_num)\times Xb/Kb \quad (55).$$

In this case, since the more bits are assigned to this I-frame by additional_Ti, in comparison with the conventional art, the picture quality of this frame is improved. Accordingly, the effects of the frame motion prediction that refers to this frame are improved.

In step S904, frame code amount assignment unit 1111 calculates a code amount for P-picture, which is being encoded, in accordance with equation (56), and finishes the frame code amount assignment.

$$Tp=R/(Np+Nb\times Kp\times Xb/(Kb\times Xp))+\text{additional\_}Tp \quad (56),$$

$$\text{additional\_}Tp=\text{residu\_bit4}\times Xp/(Kp\times Xgop6) \quad (57),$$

$$\text{residu\_bit4}=(\text{margin\_ratio}\times R\times(Nb-R\_HQ\_num)\times Xb)/(Kb\times Xgop5) \quad (58),$$

$$Xgop5=Np\times Xp/Kp+Nb\times Xb/Kb \quad (59), \text{ and}$$

$$Xgop6=Np\times Xp/Kp+(Nb-R\_HQ\_num)\times Xb/Kb \quad (60).$$

In this case, since the more bits are assigned to this P-frame by additional_Tp, in comparison with the conventional art, the picture quality of this frame is improved. Accordingly, the effects of the frame motion prediction that refers to this frame are improved.

In step S905, frame code amount assignment unit 1111 determines whether or not frame number coding_frame_num of B-picture, which is being encoded, is synchronous with remaining high picture quality frame number R_HQ_frame_num supplied from picture quality control unit 112. When they are synchronous, the process is advanced to step S906, and when not synchronous, the process is advanced to step S907.

In step S906, frame code amount assignment unit 1111 calculates a code amount for B-picture, which is immediately coded, in accordance with equation (61), and finishes the frame code amount assignment.

$$Tb=R/(Nb+Np\times Kb\times Xp/(Kp\times Xb))+\text{additional\_}Tb \quad (61), \text{ and}$$

$$\text{additional\_}Tb=\text{residu\_bit4}\times Xb/(Kb\times Xgop6) \quad (62).$$

In this case, since the more bits are assigned to this B-frame by additional_Tb in comparison with the conventional art, the picture quality of this frame is improved. Accordingly, the effects of the frame motion prediction that refers to this frame are improved.

In step S907, frame code amount assignment unit 1111 calculates a code amount for B-picture, which is immediately coded, in accordance with equation (63), and finishes the frame code amount assignment.

$$Tb=(1-\text{margin\_ratio})\times R/(Nb+Np\times Kb\times Xp/(Kp\times Xb)) \quad (63).$$

In this case, since the code amount assigned to this B-frame is reduced by margin_ratio, lowering in the picture quality of this frame is considered. However, with control of picture quality control unit 112, the motion prediction can be performed while I-, P-, B-frames that are encoded in the high picture quality are referred. Accordingly, even if the code amount is small to some degree, lowering in the picture quality is prevented by improvement of the motion prediction performance.

In step S908, frame code amount assignment unit 1111 determines the picture type of the frame, which is being encoded. In a case of I-picture, the process is advanced to step S909, in a case of P-picture, the process is advanced to step S910, and in the other case, i.e., in the case of B-picture, the process is advanced to step S911.

In step S909, frame code amount assignment unit 1111 calculates the code amount for I-picture, which is being encoded, in accordance with equation (64), and finishes the frame code amount assignment.

$$Ti=R/(1+Np\times Xp/(Kp\times Xi)+Nb\times Xb/(Kp\times Xi)) \quad (64).$$

In step S910, frame code amount assignment unit 1111 calculates the code amount for P-picture, which is being encoded, in accordance with equation (65), and finishes the frame code amount assignment.

$$Tp=R/(Np+Nb\times Kp\times Xb/(Kb\times Xp)) \quad (65).$$

In step S911, frame code amount assignment unit 1111 calculates the code amount for B-picture, which is being encoded, in accordance with equation (66), and finishes the frame code amount assignment.

$$Tb=R/(Nb+Np\times Kb\times Xp/(Kp\times Xb)) \quad (66).$$

With the above code amount assignment, without assigning a residual code amount to B-picture frames having low priority as reference frames, frames that are referred by another frame and are encoded as I-, P-, B-pictures can be encoded in the high picture quality. Accordingly, the motion prediction can be performed for all frames by-the frames that are encoded in the high picture quality, and moving pictures can be encoded in the high picture quality.

Quantizing parameter update unit 1112 obtains a quantizing parameter according to feedback control by macroblock, based on the virtual buffer capacity that is set for each picture type, in order to match code amounts Ti,p,b that are obtained in frame code amount assignment unit 1111 and are assigned to respective frames with the actual occurring code amounts. The operation of quantizing parameter update unit 1112 is similar to that of the first embodiment, the operation of each step is explained with reference to the flowchart in FIG. 11, in order to correspond to a variable name for each picture types.

In step S401, quantizing parameter update unit 1112 calculates an occupation amount of the virtual buffer by each picture type with equation (67) prior to encoding of the j-th macroblock.

$$d_{i,p,b}(j)=d_{i,p,b}(0)+B(j-1)-Ti,p,b\times(j-1)/MB\text{count} \quad (67).$$

Where, di,p,b(0) is an initial occupation amount in the virtual buffer, B(j) is an occurring code amount from the head of the frame to the j-th macroblock, and MBcount is the number of macroblocks in the frame. At completion of encoding of each frame, the initial occupation amount in the virtual buffer for each frame di,p,b(MBcount) is used as an initial occupation amount di,p,b(0) in the virtual buffer for the next picture.

In step S402, quantizing parameter update unit 1112 calculates the quantization step size relative to the j-th macroblock by equation (68).

$$Q\text{step}=Qi,p,b\times d_{i,p,b}(j)\times 31/(10\times r) \quad (68), \text{ and}$$

$$Qi,p,b=Xi,p,b/Ti,p,b \quad (69).$$

With control by frame code amount assignment unit 1111, assignment code amounts Ti,p,b of frames to be encoded in a high picture quality become larger than those of the conventional art, and code amount Tb of B-picture that is roughly encoded becomes smaller than that of the conventional art. According to equation (69), quantization step size Qb of B-picture frames that is encoded in the high picture quality becomes small, and quantization step size Qb of B-picture frames that is roughly encoded becomes large. In other words, the B-picture frame having high priority as a reference frame is encoded in a higher picture quality than the B-picture frame having low priority as the reference frame.

Here, r is a parameter used to control the response rate of the feedback loop, which is called a reaction parameter, and is represented by equation (70).

$$r = 2 \times bit\_rate/frame\_rate \quad (70).$$

Incidentally, initial values di,p(0) in the virtual buffer at start of encoding are represented by equations (71) to (73).

$$di(0) = 10 \times r/31 \quad (71),$$

$$dp(0) = Kp \times di(0) \quad (72), \text{ and}$$

$$db(0) = Kb \times di(0) \quad (73).$$

In step S 403, quantizing parameter update unit 1112 detects quantizing parameter Q corresponding to quantization step size Qstep from a quantization table. When there is no corresponding quantization step size Qstep in the quantization table, quantizing parameter update unit 1112 outputs quantization parameter Q of the quantization step size value closest to quantization step size Qstep.

Next, explanations are given of a moving picture encoding apparatus according to the fourth embodiment of the present invention. In the fourth embodiment, I-picture, P-picture, and B-picture are used as picture types used to encode frames. The moving picture encoding apparatus of the fourth embodiment is configured similarly to the moving picture encoding apparatus of the second embodiment, however, the fourth embodiment is different from the second embodiment in the operations of picture quality control unit 112 and code amount control unit 111 because encoding is performed by using B-pictures. In this arrangement, the operation of code amount control unit 111 is similar to that of code amount control unit 111 according to the third embodiment. Therefore, picture quality control unit 112 according to the forth embodiment is explained below.

Picture quality control unit 112 includes picture quality determination unit 1121 and picture quality control counter 1122, similarly to the third embodiment. The picture quality control unit of the fourth embodiment is different from the picture quality control unit of the third embodiment in that the operation of picture quality determination unit 1121 by the frame differential information and the frame motion information supplied from moving picture analysis unit 112 is changed. The operation of picture quality determination unit 1121 according to the fourth embodiment is explained with reference to FIG. 24.

Figure 24:
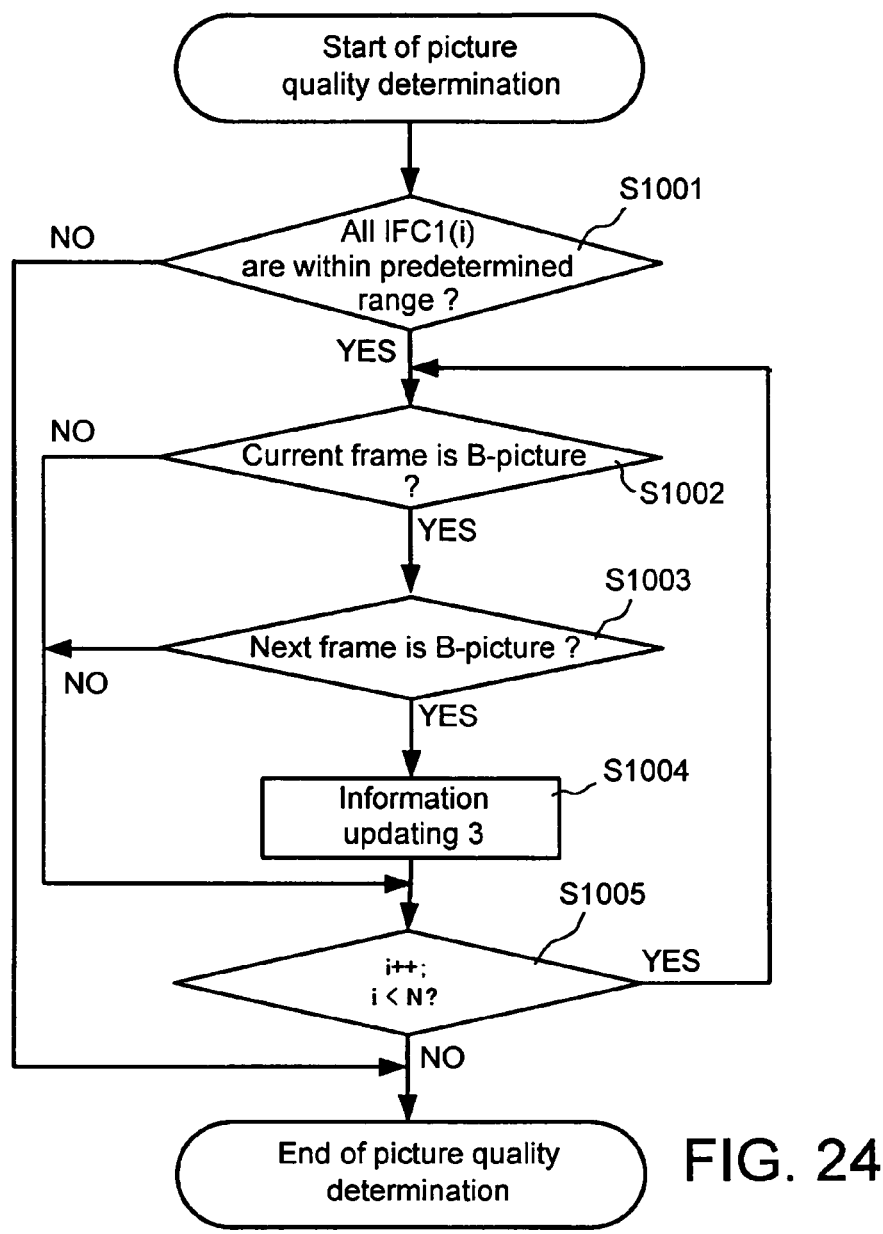
FIG. 24 is a flowchart showing a picture quality determination process.

The calculation procedure for number of high picture quality frames HQ_num and high picture quality frame number HQ_frame_num[HQ_num] is explained with reference to FIG. 24, when the number of frames included in GOP is set to N and the frame number in picture quality determination process is set to i. The initial value of i is 1 and the initial value of HQ_num is 0.

First, in step S1001, picture quality determination unit 1121 calculates inter-frame cost IFC1(i) of each frame i and the reference frame thereof by using frame differential information FD1(i) and frame motion information FMV1(i) supplied from moving picture analysis unit 113 in accordance with equation (40). Also, picture quality determination unit 1121 obtains IFC_UPPER_LIMIT and IFC_LOWER_LIMIT in accordance with equations (42) to (44) on the assumption that MIN_IFC(i)=lFC(i) is satisfied relative to MIN_IFC(i) in equation (42). On that basis, picture quality determination unit 1121 determines whether or not all of IFC1(i) satisfy IFC_LOWER_LIMIT<IFC(i)<IFC_UPPER_LIMIT. When all of IFC1(i) are within the above range, the process is advanced to step S1002 while setting i=1, and when not, the process is finished.

In step S1002, picture quality determination unit 1121 determines whether or not the coding type of the i-th frame that is currently to be analyzed is B-picture. When the coding type is B-picture, the process is advanced to step S1003, and when not B-picture, the process is advanced to step S1005.

In step S1003, picture quality determination unit 1121 determines whether or not the coding type of the successive (i+1)-th frame is B-picture. When the coding type is B-picture, the process is advanced to step S1004, and when not B-picture, the process is advanced to step S1005.

In step S1004, picture quality determination unit 1121 stores the current i-th frame as high picture quality frame number HQ_frame_num[HQ_num] in accordance with equation (49) and updates number of high picture quality frames HQ_num in accordance with equation (50).

In step S1005, picture quality determination unit 1121 increments the frame number i to be processed by 1 and determines whether or not frame number i is smaller than number N of frames. When frame number i is smaller than N, the process is returned to step S1002, and when not smaller, the process is finished.

After completion of the above processes, picture quality determination unit 1121 turns high picture quality flag HQ_flg on when HQ_num is not less than 1, and turns HQ_flg off when HQ_num is less than 1.

Since moving picture analysis unit 113 is also arranged in the present embodiment, B-picture frames to be encoded in the high picture quality can be selected with accuracy, in consideration of momentary picture fluctuations, such as a scene change and a flash, in GOP and the effects of large fluctuations in encoding difficulty of the scene. Accordingly, moving pictures can be encoded a still higher picture quality.

Next, the fifth embodiment of the present invention is explained. The moving picture encoding apparatus according to the present invention, as above explained, can be configured by hardware, as is clear from the above explanations, and can be also carried out by a computer program.

Figure 25:
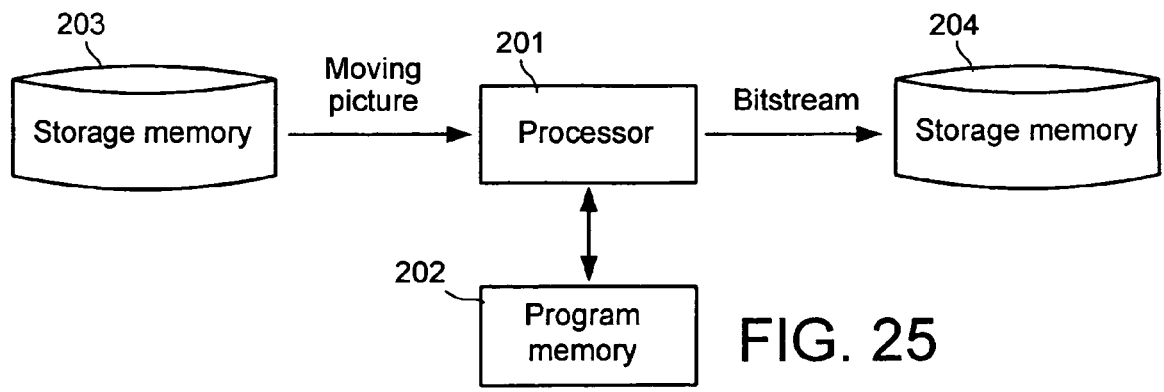
FIG. 25 is a typical block diagram of an information processing system installed with the moving picture encoding apparatus according to the present invention.

FIG. 25 shows an information processing system according to the fifth embodiment of the present invention, and shows a typical configuration of the information processing system in which the moving picture encoding apparatus according to the present invention is implemented.

This information processing system includes processor 210, program memory (main memory) 202, and storage media 203, 204. Storage media 203, 204 are separate storage media and different storage areas in one storage medium. As a storage medium, a magnetic storage medium, like a hard disk drive, may be used.

Then, a program for making the information processing system perform the above-mentioned moving picture encoding process is stored in program memory 202, and processor 210 executes the program, whereby this information processing system functions as the above-mentioned moving picture encoding apparatus. Input moving picture data is previously stored in storage medium 203, and the bitstreams that have been encoded are stored in storage medium 204.

Therefore, the scope of the present invention includes a program for making a computer perform the moving picture encoding process according to the present invention, a computer readable storage medium stored with such a program, and a program product including such a program.

A computer program according to the present invention, for example, for making a computer that executes moving picture encoding by performing a multi-frame motion prediction with reference to a plurality of picture frames, execute:

a process of selecting at least one reference frame among a plurality of reference frames of the same picture type; and a process of encoding the selected reference frame in a higher picture quality than the other reference frames of the same picture type.

Alternatively, a computer program according to the present invention, for example, for making a computer that executes moving picture encoding by performing a multi-frame motion prediction with reference to a plurality of picture frames, execute:

a process of obtaining differential information and motion information between a reference frame and a subject frame to be encoded;

a process of selecting at least one reference frame among a plurality of reference frames of the same picture type in a manner that an interval of selected reference frames is adaptively changed in accordance with the differential information and the motion information; and a process of encoding the selected reference frame in a higher picture quality than the other reference frames of the same picture type.

Next, as the sixth embodiment, explanations are given of an input/output apparatus to/from which the moving picture data or the moving picture bitstream, for example, encoded by the moving picture encoding apparatus according to the first to fifth embodiments is input and output. In this description, as an example of the input/output apparatus to/from which the moving picture data (moving picture bitstream) is input and output, explanations are given of a receiver that receives the moving picture encoded bitstream generated according to the first or second embodiment as an input.

However, there is no limitation on the input/output apparatus according to the present invention, and the input/output apparatus according to the present invention may be a frame synchronizer to/from which the moving picture data is input and output, a record apparatus such as a video apparatus, and the like.

Figure 26:
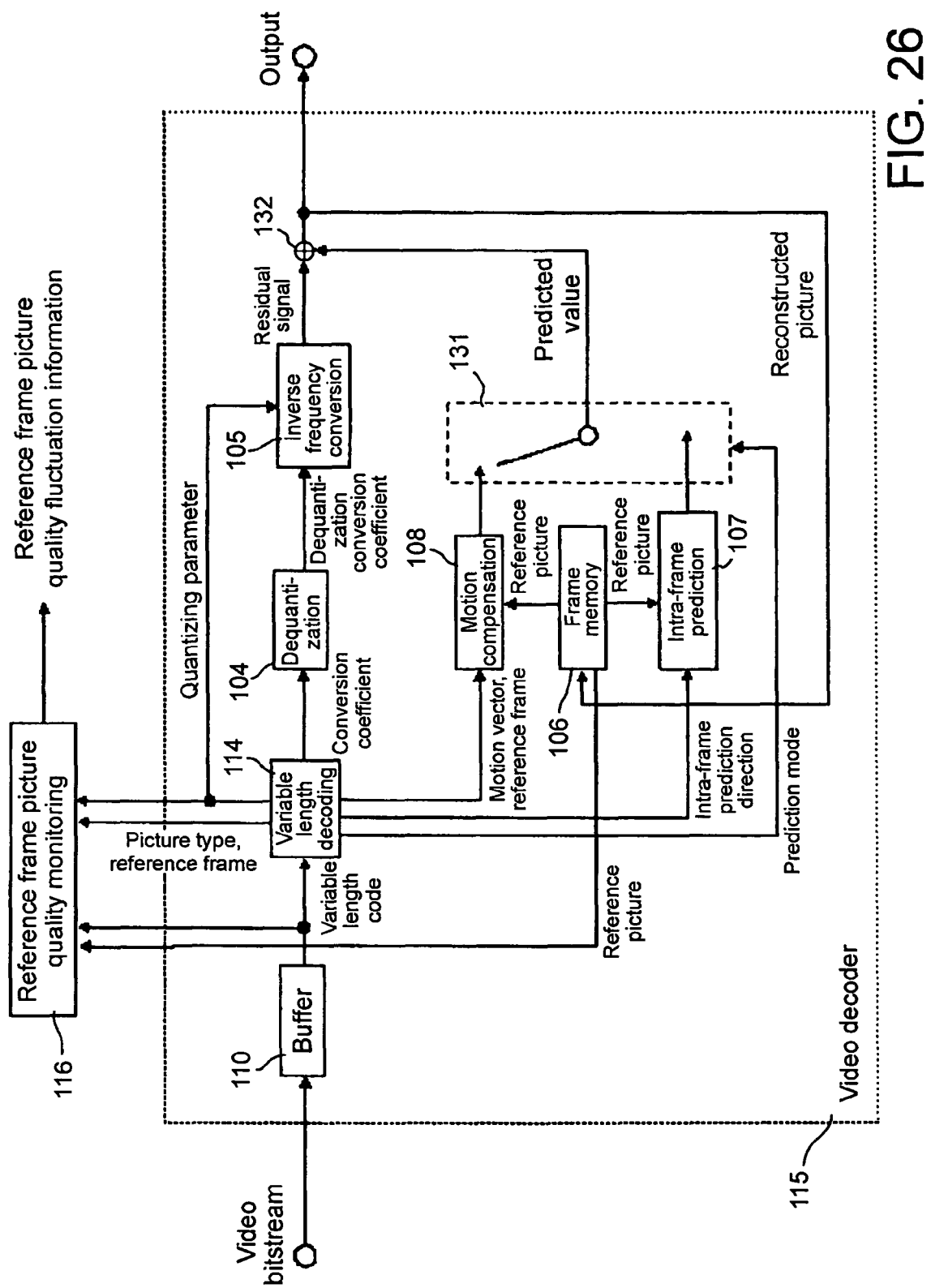
FIG. 26 is a block diagram showing an example of a receiver to which a moving picture bitstream generated according to the present invention is supplied.

As shown in FIG. 26, a receiver is provided with video decoder 115 and reference frame picture quality monitor 116. Video decoder 115 is similar to the conventional moving picture decoding apparatus which is paired with the conventional moving picture encoding apparatus shown in FIG. 1. In other words, video recorder 115 includes dequantization unit 104, inverse frequency conversion unit 105, frame memory 106, inter-frame prediction unit 107, motion compensation unit 108, and buffer 110, which constitute a local decoding apparatus in the moving picture encoding apparatus shown in FIG. 1. Further, video recorder 115 includes variable length encoding unit 114. Functions of these elements in video decoder 115 are similar to those of the conventional moving picture encoding apparatus shown in FIG. 1, except variable length decoding unit 114.

The video bitstream input to video recorder 115 mainly includes, as constituent elements, a conversion coefficient obtained by dividing an original input picture into a plurality of blocks with the moving picture encoding apparatus and by frequency converting and quantizing a prediction error signal, which a predicted value is subtracted from these blocks by the inter-frame prediction unit or the motion compensation unit, and a code string, which a moving vector for generating the predicted value and the reference frame are variable length decoded.

Variable length decoding unit 114 decodes the variable length code supplied from buffer 110, which is stored with the received bitstream, into original values. The decoded values include the conversion coefficient, the quantization parameter, the picture type, the motion vector, the reference frame, and the like.

Dequantization unit 104 dequantizes the conversion coefficient by using the quantizing parameter and generates a dequantization conversion coefficient. Inverse frequency conversion unit 105 applies inverse frequency conversion to the dequantization conversion coefficient and generates a prediction error signal. The predicted value supplied from inter-frame prediction unit 107 or motion compensation unit 108 is added to the prediction error signal by adder 132, and a decoded picture is obtained. It can be selected which predicted value from inter-frame prediction unit 107 or motion compensation unit 108, by switch 131. The video decoder repeats these processes, thereby obtaining the decoded picture. Also, the decoded picture, obtained like this, is stored in frame memory 106 as a reconstructed picture and is used to generate the predicted value by inter-frame prediction unit 107, motion compensation unit 108, and motion estimation unit 109.

Next, the operation of reference frame picture quality monitor 114 is explained.

Reference frame picture quality monitor 114 monitors the picture type, the reference frame, the quantizing parameter, the variable length code, and the frame memory supplied from video decoder 115, and outputs reference frame picture quality fluctuation information consisting of a reference frame picture quality fluctuation flag. The reference frame picture quality fluctuation flag indicates that the more code amount is assigned to the reference frame used for the motion compensation (multi-frame motion prediction) for decoding of the moving picture bitstream than other frames of the same picture type or whether or not a moving picture coding bitstream includes a frame having a small quantizing parameter.

The reference frame picture quality fluctuation flag is specifically obtained by storing the picture type, the code amount, and the average quantizing parameter in decoding of the frame that is a reference frame referred from another frame after decoding and by checking that the more code amount is assigned to the reference frame stored in the memory frame than other frames of the same picture type or is obtained by checking whether or not a moving picture coding bitstream includes a frame having a small quantizing parameter.

Figure 27:
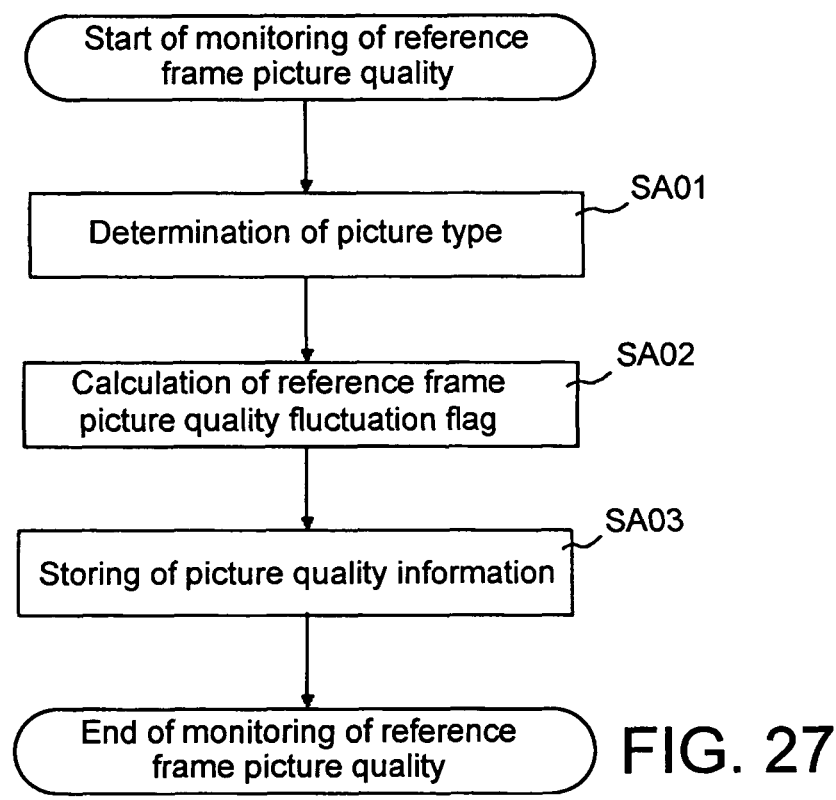
FIG. 27 is a flowchart showing a process for generating a reference frame picture quality fluctuation flag.

FIG. 27 shows processes for generating the reference frame picture quality fluctuation flag, where the picture type corresponding to reference frame number i (1<i< MAX_REF) stored in the frame memory is pic_type(i), the code amount of the whole frame is total_bit(i), and the average quantizing parameter of the whole frame is average_q(i).

First, in step SA01, reference frame picture quality monitor 114 determines whether the picture type of the frame, which is being decoded, is P-picture or B-picture. When the picture type is P-picture or B-picture, the process is advanced to step SA02, and when neither P-picture nor B-picture, the reference frame picture quality fluctuation flag is turned off and the process is finished.

In step SA02, reference frame picture quality monitor 114 determines that the more code amount is assigned to the i-th frame than the j-th reference frame as condition 1, or that the quantizing parameter is small as condition 2, in a plurality of reference frames ref (1<ref<MAX_REF) of the same picture type as the frame, which is being decoded.

Condition 1 can be described as:

total_bit(i)≈(1+margin_ratio)×total_bit(j),
pic_type(i)=pic_type(j), and i≠j.

Condition 2 can be described as:

average_q(i)≈(1/(1+margin_ratio)×average_q(j),
pic_type(i)=pic_type(j), and i≠j.

In step SA02, condition 1 or condition 2 is satisfied, since the more code amount is assigned to the reference frame used by the moving picture bitstream for the motion prediction, than the other frames of the same picture type, or since such a reference frame is the moving picture encoded bitstream, reference frame picture quality monitor 114 turns the reference frame picture quality fluctuation flag on. When neither condition 1 nor condition 2 is satisfied, the reference frame picture quality fluctuation flag is turned off.

Then, in step SA03, reference frame picture quality monitor 114 inspects the code length of the variable length code supplied from buffer 110 to calculate code amount tmp_total_bit of the whole subject frame to be decoded and calculates average quantizing parameter tmp_avaerage_Q of the whole frame from the quantizing parameter by MB supplied from reference frame picture quality monitor 114. Also, at this time, picture type tmp_pc_type supplied from reference frame picture quality monitor 114 is stored. With timing in that the current subject frame to be decoded is stored in frame memory 106 as number k after completion of decoding, reference frame picture quality monitor 114 stores tmp_total_bit, tmp_avaerage_Q, and tmp_pc_type into pic_type (k), total_bit(k), and average_q(k), respectively, and then the process is finished.

The calculation of the reference frame picture quality fluctuation flag, like this, is performed whenever each frame is decoded.

With the above processes, when the reference frame picture quality fluctuation flag is turned on, it can be confirmed that the more code amount is assigned to the moving picture bitstream generated by the moving picture encoding method according to the present invention, which is the reference frame used for multi-frame motion prediction, than the other frames of the same picture type, or that the frame having the small quantizing parameter is included.

The invention claimed is:

1. A moving picture encoding method executed by using an encoder for performing a multi-frame motion prediction with reference to a plurality of picture frames, comprising:
   selecting reference frames from a plurality of reference frames which are used for the multi-frame motion prediction of a subject frame to be encoded, the subject frame to be encoded and the plurality of reference frames having a same picture frame type;
   encoding by said encoder the selected reference frames in a higher picture quality than others of the plurality of reference frames of the same picture type; and
   arranging the frames encoded in the higher picture quality at constant frame intervals,
   wherein said selecting comprises:
   calculating differential information and motion information between each respective subject frame to be encoded and each corresponding one of the plurality of reference frames;
   calculating a linear sum of the differential information and the motion information to determine an inter-frame cost for each subject frame to be encoded between the each subject frame to be encoded and a reference frame which is used for encoding the each subject frame to be encoded; and
   selecting reference frames to be encoded in the higher picture quality based on the linear sum.

2. The method according to claim 1, wherein the reference frames encoded in the higher picture quality are frames having a smaller quantizing parameter than the others of the plurality of reference frames of the same picture type.

3. The method according to claim 1, wherein the reference frames encoded in the higher picture quality are P-picture frames.

4. The method according to claim 1, wherein the reference frames encoded in the higher picture quality are B-picture frames.

5. The method according to claim 4, further comprising a step of:
   when a plurality of continuous B-picture frames are encoded, in comparison with a final B-picture frame in said continuous B-picture frames, encoding B-picture frames prior to said final B-picture frame in a higher picture quality.

6. A moving picture encoding apparatus for performing a multi-frame motion prediction with reference to a plurality of picture frames, comprising:
   selection means for selecting reference frames from a plurality of reference frames which are used for the multi-frame motion prediction of a subject frame to be encoded, the subject frame to be encoded and the plurality of reference frames having a same picture frame type; and
   encoding means for encoding the selected reference frames in a higher picture quality than others of the plurality of reference frames of the same picture type,
   wherein said selection means comprises:
   means for calculating differential information and motion information between each respective subject frame to be encoded and each corresponding one of the plurality of reference frames;
   means for calculating a linear sum of the differential information and the motion information to determine an inter-frame cost for each subject frame to be encoded between the each subject frame to be encoded and a reference frame which is used for encoding the each subject frame to be encoded; and
   means for selecting reference frames to be encoded in the higher picture quality based on the linear sum, and
   wherein the frames encoded in the higher picture quality are arranged at constant frame intervals.

7. A moving picture encoding apparatus which performs a multi-frame motion prediction with reference to a plurality of picture frames, comprising:
   a selector which selects reference frames from a plurality of reference frames which are used for the multi-frame motion prediction of a subject frame to be encoded, the subject frame to be encoded and the plurality of reference frames having a same frame type; and
   an encoder which encodes the selected reference frames in a higher picture quality than others of the plurality of reference frames of the same picture type,
   wherein said selector comprises:
   an analyzer which calculates differential information and motion information between each respective subject frame to be encoded and each corresponding one of the plurality of reference frames;

a determiner which calculates a linear sum of the differential information and the motion information to determine an inter-frame cost for each subject frame to be encoded between the each subject frame to be encoded and a reference frame which is used for encoding the each subject frame to be encoded; and a controller which selects reference frames to be encoded in the higher picture quality based on the linear sum, and wherein the frames encoded in the higher picture quality are arranged at constant frame intervals.

8. The apparatus according to claim 7, wherein said encoder sets a smaller quantizing parameter for the selected reference frames than the others of the plurality of reference frames of the same picture type.

9. The apparatus according to claim 7, wherein said selected reference frames are P-picture frames.

10. The apparatus according to claim 7, wherein said selected reference frames are B-picture frames.

11. The apparatus according to claim 10, wherein said selector, from a plurality of continuous B-picture frames, selects a B-picture frame prior to a final B-picture frame in said continuous B- picture frames.

12. The apparatus according to claim 7, wherein said selector selects said reference frames at constant frame intervals.

13. An apparatus to which moving picture data encoded by performing a multi-frame motion prediction with reference to a plurality of picture frames is input or output from:

wherein said encoded moving picture data includes frames encoded in higher picture quality than other frames of a same picture type in a plurality of reference frames used for the multi-frame motion prediction of a subject frame to be encoded, and wherein the subject frame to be encoded and the plurality of reference frames have the same picture type, and wherein said reference frames to be encoded in the higher picture quality are selected based on a linear sum of differential information and motion information to determine an inter-frame cost for each subject frame to be encoded between the each subject frame to be encoded and a reference frame which is used for encoding the each subject frame to be encoded, the differential information and the motion information being calculated between each respective subject frame to be encoded and each corresponding one of the plurality of reference frames.

14. An apparatus to which moving picture data encoded by performing a multi-frame motion prediction with reference to a plurality of picture frames is input and output from, the apparatus comprising:

a video decoder which decodes said encoded moving picture data; and a monitor which monitors a picture type, a plurality of reference frames, a quantizing parameter, a variable length code, and a frame memory, supplied from said video decoder and determines whether or not said encoded moving picture data includes a reference frame that is used for the multi-frame prediction of a subject frame to be encoded and that is encoded in the higher picture quality than the other frames of a same picture type, wherein the subject frame to be encoded and the plurality of reference frames have the same picture type, and wherein said reference frame to be encoded in the higher picture quality is selected based on a linear sum of differential information and motion information to determine an inter-frame cost for each subject frame to be encoded between the each subject frame to be encoded and a reference frame which is used for encoding the each subject frame to be encoded, the differential information and the motion information being calculated between each respective subject frame to be encoded and each corresponding one of the plurality of reference frames.

* * * * *

UNITED STATES PATENT AND TRADEMARK OFFICE
CERTIFICATE OF CORRECTION

PATENT NO. : 9,071,846 B2
APPLICATION NO. : 10/584220
DATED : June 30, 2015
INVENTOR(S) : Keiichi Chono It is certified that error appears in the above-identified patent and that said Letters Patent is hereby corrected as shown below:

In the specification

Column 1, Line 27: Delete "dehumanization" and insert -- dequantization --

Column 8, Line 58: Delete "prev_hq_num," and insert -- prev_hq_num, --

Column 14, Line 5: Delete "$diff(ref, mvx, mvy) \sum_{i=0, j=0}^{i=w-1, j=h-1} absref\_pixel(cur\_pixel(i, j) - (ref, i+mvx, j+mvy)),$" and insert -- $diff(ref, mvx, mvy) \sum_{i=0, j=0}^{i=w-1, j=h-1} abs(cur\_pixel(i, j) - ref\_pixel(ref, i+mvx, j+mvy))$ --

Column 25, Line 12: Delete "$average\_q(i) \approx (1/(1+margin\_ratio)) \times average\_q(j), pic\_type(i) = pic\_type(j), and\ i \neq j.$" and insert -- $average\_q(i) \approx (1/(1+margin\_ratio)) \times average\_q(j), pic\_type(i) = pic\_type(j), and\ i \neq j.$ --

In the claims

Column 26, Line 61: In Claim 7, delete "frame" and insert -- picture --

Signed and Sealed this
Fifteenth Day of December, 2015

Michelle K. Lee
*Director of the United States Patent and Trademark Office*